(12) United States Patent
Wang et al.

(10) Patent No.: US 12,248,054 B2
(45) Date of Patent: Mar. 11, 2025

(54) SYSTEM AND METHOD FOR DETECTING AN OBJECT IN A SCENE

(71) Applicant: Mitsubishi Electric Research Laboratories, Inc., Cambridge, MA (US)

(72) Inventors: Pu Wang, Cambridge, MA (US); Sian Jin, Cambridge, AL (US); Petros Boufounos, Winchester, AL (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 388 days.

(21) Appl. No.: 17/823,134

(22) Filed: Aug. 30, 2022

(65) Prior Publication Data

US 2024/0077601 A1    Mar. 7, 2024

(51) Int. Cl.
*G01S 13/58* (2006.01)
*G01S 13/931* (2020.01)

(52) U.S. Cl.
CPC .......... *G01S 13/584* (2013.01); *G01S 13/931* (2013.01)

(58) Field of Classification Search
CPC ........ G01S 13/931; G01S 13/42; G01S 13/56; G01S 13/60; G01S 13/66
See application file for complete search history.

(56) References Cited

U.S. PATENT DOCUMENTS

2021/0116531 A1\*  4/2021  Shabtay .............. G06F 18/2431
2021/0318424 A1   10/2021  Wang et al.

FOREIGN PATENT DOCUMENTS

CN            106154235 A   \* 11/2016

OTHER PUBLICATIONS

Wang, Pu, and Hongbin Li. "Target detection with imperfect waveform separation in distributed MIMO radar." IEEE Transactions on Signal Processing 68 (2020): 793-807 (Year: 2020).\*

(Continued)

*Primary Examiner* — Peter M Bythrow
*Assistant Examiner* — Nazra Nur Waheed
(74) *Attorney, Agent, or Firm* — Gene Vinokur

(57) ABSTRACT

The present disclosure provides a multiple-input multiple-output (MIMO) radar system and a method for detecting an object in a scene. The method comprises transmitting frequency modulated continuous wave (FMCW) in a radio frequency (RF) band, and collecting radar measurements of the scene sampled in a time-frequency domain within an intermediate frequency (IF) bandwidth. The method further comprises transforming the radar measurements into range-doppler space to produce measurements of different segments of the scene for different range-doppler bins formed by intersections of different range bins with different Doppler bins, classifying a presence of the hypothetical transmitter at different segments of the scene according to a signal model with an internal classification, combining the results of the classification to produce parameters of the object, and outputting the parameters of the object.

20 Claims, 13 Drawing Sheets

(56) References Cited

OTHER PUBLICATIONS

A. Bose, B. Tang, M. Soltanalian and J. Li, "Mutual Interference Mitigation for Multiple Connected Automotive Radar Systems," in IEEE Transactions on Vehicular Technology, vol. 70, No. 10, pp. 11062-11066, Oct. 2021, doi: 10.1109/TVT.2021.3108714.
F. Uysal, "Synchronous and Asynchronous Radar Interference Mitigation," in IEEE Access, vol. 7, pp. 5846-5852, 2019, doi: 10.1109/ACCESS.2018.2884637.

* cited by examiner $$H_0, \quad y = \widetilde{a}'_t \otimes \widetilde{a}_r + z$$

$$H_1, \quad y = \underbrace{ba_t \otimes a_r}_{213} + \widetilde{a}'_t \otimes \widetilde{a}_r + z$$

FIG. 2A

SYSTEM AND METHOD FOR DETECTING AN OBJECT IN A SCENE

TECHNICAL FIELD

The present disclosure relates generally to a radar system, and more specifically to a system and a method for detecting an object in a scene under mutual interference presence in the radar system.

BACKGROUND

Automotive radar has manifested its role from existing advanced driver assistance systems (ADAS) to emerging autonomous driving. Along with ultrasonic, camera, and Light Detection and Ranging (LIDAR) sensors, the automotive radar assists in the task of environmental sensing and determining parameters of a nearby object, such as range, velocity, and angles. Particularly, the automotive radar provides direct measurements of radial velocities, long operating ranges, small sizes at millimeter or sub-terahertz frequency bands, and high spatial resolutions.

The automotive radar widely adopts a frequency modulated continuous wave (FMCW) because of its simple transceiver architecture and low requirements on sampling rate to harness the benefit of wide frequency bandwidth. At the same time, for achieving high angular resolution, multiple-input multiple-output (MIMO) radar has been proposed to synthesize a virtual array using limited transmit (Tx) and receive (Rx) antenna chains. More specifically, for detecting the object, the MIMO radar with M Tx antennas and N Rx antennas can synthesize a virtual linear arrays array (ULA) of size MN. For multiple FMCW radars operating in the same regulated frequency bands, mutual radar interference is anticipated. The mutual radar interference degrades the accuracy of object detection. Thus, there is a need for a system and a method for mutual interference mitigation in the MIMO radars.

SUMMARY

It is an objective of some embodiments to provide a system and a method for mutual interference mitigation in a MIMO radar system, such as FMCW-MIMO automotive radar. Additionally or alternatively, it is an objective of some embodiments to provide a signal model that can unite different nature of radar transmissions and interference in a computationally tractable manner Additionally or alternatively, it is an objective of some embodiments to provide such a signal model that can detect an object (such as a pedestrian, a car, and the like) in a scene from radar measurements subject to an unknown interference.

The MIMO radar system includes a set of transmitters and a set of receivers. Each transmitter of the set of transmitter transmits a reference signal such as FMCW signal towards the object. The MIMO radar system may include a signal generator that generates the reference signal for the set of transmitters. Further, the object may be a moving object or a stationary object. To detect the object, the reference signals from different transmitters of the set of transmitters can be separated in certain domains, e.g., time, frequency, or code domains. To that end, the MIMO radar system, encodes each reference signal with orthogonal codes (e.g. Hadamard code). The MIMO radar system may include an orthogonal code generator that generates the orthogonal codes to encode each reference signal transmitted by each transmitter of the set of transmitters. Therefore, when two transmitted signals encoded with the orthogonal codes interfere, they produce a null, ideally, and thus waveform separation with respect to each reference waveform can be achieved. Thus, the MIMO radar system transmits several coded pulses, where each coded pulse is orthogonal to the other. The orthogonal codes are also used at receivers for waveform separation.

Further, the MIMO radar system uses the set of receivers to receive echoes or reflections of the transmitted signals (i.e. the coded pulses/reference signals). The transmitted signals may be reflected from the object. Each receiver receives a signal that is a superposition of reflections of the multiple reference signals transmitted by the set of transmitters i.e., each receiver receives a combined signal, where each signal of the combined signal corresponds to reflections of all the transmitted signals. To detect the object, in some embodiments, the MIMO radar system is configured to separate each waveform of reflection of the transmitted signal from the combined signal that is a superposition of all reflected transmitted signals.

Some embodiments are based on the recognition that the MIMO radar system can utilize the orthogonal codes that are used at the transmitter to achieve the waveform separation at the set of receivers. To that end, each receiver is configured to multiply the received combined signal with the corresponding orthogonal code (i.e. the FMCW signal) used by the transmitter corresponding to that receiver. Due to the property of orthogonality of the codes, multiplication of two different codes will result in a zero value ideally, whereas multiplication with the same code results in a non-zero value.

Using this property of orthogonality, each receiver can separate the reflection waveform corresponding to the reference signal transmitted by each transmitter, from the combined signal. However, a perfect waveform separation is unlikely when an interfering waveform arrives at the receiver with a different set of codes, i.e. in some waveform separation residuals are still left in the separated reflection waveform. The residuals may be due to an interfering radar present in the scene. In particular, the residuals are due to signals transmitted by a set of transmitters of the interfering radar. In an embodiment, the interfering radar may also be a MIMO radar. If residuals due to the interfering radar are not taken into account for detecting the object, an accuracy of the MIMO radar system to detect objects may be degraded.

To that end, some embodiments are based on a recognition that a signal model for processing radar measurements should include (1) an object signal model for reflections of the transmitted signals forming the radar measurements and (2) an interference signal model for the interference due to the interfering radar.

The object signal model may be given as $$y = b a_t \otimes a_r.$$

where $a_t \triangleq [1, \ldots, e^{-j2\pi f_\psi(M-1)}]^t$ is the MIMO radar system's transmitter steering vector (also referred to as an ego-transmitter steering vector) if a uniform linear array (ULA) of antennas is used for transmitting the waveforms, and $a_r \triangleq [1, \ldots, e^{-j2\pi f_\psi(N-1)}]^t$ is the MIMO radar system's receiver steering vector from the object (also referred to as an ego-receiver steering vector) if a ULA of antennas is used for receiving the waveforms.

In some embodiments, $a_t$ is a function of a relative angle between each transmitter of the set of transmitters and the object, a wavelength of the transmitted signal, and a relative distance between the two consecutive transmitter elements of the set of transmitters. Similarly, $a_r$ is a function of a relative angle between each receiver of the set of receivers and the object, a wavelength of the received signal, and a relative distance between the two consecutive receiver elements of the set of receivers. Such an object signal model is possible due to the representation of the reflection from the object in the scene as radar transmission from a hypothetical transmitter having the structure of the MIMO radar system and co-located with the object.

Some embodiments are based on the realization that the residual due to the interfering radar can be formulated as Kronecker product of an equivalent interfering radar's transmitter steering vector (also referred to as an interfering-transmitter steering vector) and the MIMO radar system's receiver steering vector at the angle of the interfering radar. To that end, the interference signal model may be given as $$y' = \tilde{a}'_t \otimes \tilde{a}_r$$

where $\tilde{a}'_t \triangleq [\tilde{a}'_{t,0}, \tilde{a}'_{t,1}, \ldots, \tilde{a}'_{t,M-1}]^T$ is the interfering radar's transmitter steering vector that is a function of interfering radar parameters (e.g., FMCW configuration parameters, transmitting antenna geometry parameters, the set of MIMO codes, and relative transmitting time offset w.r.t. the MIMO radar) and the MIMO radar parameters (e.g., FMCW configuration parameters, transmitting antenna geometry parameters, the set of MIMO codes, and sampling frequency) and $\tilde{a}_r \triangleq [1, e^{-j2\tilde{f}_{\phi r}}, \ldots, e^{j2\pi\tilde{f}_{\phi r}(N-1)}]^T$ is the MIMO radar system's receiver steering vector at the angle of the interfering radar.

Notably, the receiving steering vectors for the MIMO radar system and the interfering radar have the same structure but may modify the same or different angles. In other words, the receiving steering vectors for the MIMO radar system and the interfering radar are functions of unknown angles and different embodiments may impose the constraint on having the same angles to explain the radar measurements or relaxing this constraint. Such flexibility allows different embodiments either reduce the computational burden of evaluation of the radar measurements or introduce fewer assumptions for increased accuracy.

Given the object and interference signal models, a spatial-domain object detection under mutual interference is formulated as a binary hypothesis problem $$\begin{cases} H_0, & y = \tilde{a}'_t \otimes \tilde{a}_r + z \\ H_1, & y = ba_t \otimes a_r + \tilde{a}'_t \otimes \tilde{a}_r + z \end{cases},$$

where y is a complex-valued range-Doppler spectrum at a given range-Doppler bin defining a segment of a scene, b is a complex-valued unknown object amplitude, z is noise. First hypothesis $H_0$ defines that the separated waveform includes only the residual due to the interference, and the noise (i.e. no object is present at assumed transmitting and receiving angles). Second hypothesis $H_1$ defines that the separated waveform includes 1) the object at certain angles; 2) the residual due to the interference; and 3) the noise. Additionally, the second hypothesis represents the signal model as a combination of the object signal model and the interference signal model.

The binary hypothesis problem is solved for each range-doppler bin. For instance, the analysis of the scene can be transformed into the range-Doppler frequency domain and the binary hypothesis problem is solved separately for each range-doppler bin and for each quantized angle within the range-doppler bin. However, the binary hypothesis problem includes many unknowns which makes the spatial-domain object detection under the interference challenging. For example, the complex amplitude 'b' is unknown, the MIMO radar system's receiver steering vector from the interfering radar $\tilde{a}_r$ is unknown, and the interfering radar's transmitter steering vector $\tilde{a}'_t$ is unknown.

Some embodiments are based on the realization that the MIMO radar system's receiver steering vector $\tilde{a}_r$ from the interfering radar can be assumed to be known. Such an assumption is valid and is based on an observation that $\tilde{a}_r$ shares the same structure, i.e., a Fourier vector, as the steering vector $a_r$ at an angle of the interference. The interference angle can be estimated when the MIMO radar does not actively transmit but passively detect the interference, e.g., in the MIMO radar system's idle duration between two coherent processing intervals (CPIs). Thus, $\tilde{a}_r$ is known but $\tilde{a}'_t$ is unknown.

To that end, solving the binary hypothesis problem at a certain quantized angle within the range-doppler bin implies determining presence or absence of the object at the certain quantized angle while assuming a position of the interference radar at each of the other quantized angles in the range-doppler bin. The absence or presence of the object can be represented as a result of a set of binary classification run over the range-doppler bin and quantized angles.

As a result, radar measurements of a specific range-Doppler bin coming from a specific angle can be explained by just two unknowns. The first unknown is a result of a binary classification governing the presence or the absence of an object having a state corresponding to the specific range-Doppler bin and the specific angle, which define a location and velocity of the object. The second unknown is a structure of the transmitting interference radar ($\tilde{a}'_t$). This unknown structure can capture the entire versatility of the nature of the interference.

In such a manner, some embodiments define a signal model with an internal classification that explains the radar measurements of the range-Doppler bin for the unknown angles. For each angle, the signal model explains the corresponding radar measurements as a combination of an optional transmission of the known transmitter to the known receiver, e.g., the object reflected waveform due to the waveform transmitted from the MIMO radar with known parameters, and a mandatory transmission of an unknown transmitter to the same known receiver, e.g., the interfering waveform transmitted from the interfering radar with unknown parameters.

Because the optional transmission is defined by the results of the binary classification, such a classification is referred to herein as an internal classification because it explains only a portion of the signal model. However, the results of the binary classification are what embodiments of the present disclosure aim to determine to explain the scene. In such a manner, the processing of radar measurements can be reduced to a classification problem.

According to some embodiments, a generalized likelihood ratio test (GLRT) algorithm may be used to solve the binary hypothesis problem and determine the presence of the object in the spatial domain. The GLRT determines a GLRT statistic. The GLRT statistic is compared with a predetermined threshold. The predetermined threshold is based on a number of transmitters and receivers. If the GLRT statistic is greater than the predetermined threshold, then the second hypothesis is true. Conversely, if the GLRT statistic is less than the predetermined threshold, the first hypothesis is true.

Accordingly, one embodiment discloses a multiple-input multiple-output (MIMO) radar system for detecting an object in a scene. The MIMO radar system comprises an ego-transmitter with a set of transmitters and an ego-receiver with a set of receivers with a known mutual arrangement to each other forming a virtual array of the MIMO radar system with pairwise combinations of different transmitters with different receivers configured to (1) transmit frequency modulated continuous wave (FMCW) in a radio frequency (RF) band over a sequence of pulse repetition intervals (PRI); and (2) collect radar measurements of the scene sampled in a time-frequency domain within an intermediate frequency (IF) bandwidth to which reflection of the transmitted FMCW is shifted by mixing with a copy of the FMCW; a memory configured to store a signal model with an internal classification that explains measurements corresponding to a segment of the scene defined by relative distance and relative velocity with respect to the ego-transmitter as a combination of an optional transmission of a hypothetical transmitter with a structure of the ego-transmitter and located within the segment of the scene to the ego-receiver and a mandatory transmission from an interfering transmitter with unknown structure and located within the segment of the scene to the ego-receiver; and a processor coupled with instructions that, when executed by the processor, cause the MIMO radar system to: transform the radar measurements into range-doppler space to produce measurements of different segments of the scene for different range-doppler bins formed by intersections of different range bins with different Doppler bins; classify a presence of the hypothetical transmitter at different segments of the scene according to the signal model with the internal classification explaining the measurements for different segments of the scene independently of each other; combine the results of the classification to produce parameters of the object indicated by the results of classification of the presence or absence of the hypothetical transmitter in different segments of the scene; and output the parameters of the object.

Accordingly, another embodiment discloses a method for detecting an object in a scene. The method uses a processor coupled to a memory storing a signal model with an internal classification that explains measurements corresponding to a specific state in the scene as a combination of an optional transmission from an ego-transmitter having the state in the scene to an ego-receiver having a state of a multiple-input multiple-output (MIMO) radar system and a mandatory transmission from an interfering transmitter with unknown structure and having the state in the scene to the ego-receiver having the state of the MIMO radar system, wherein the processor is coupled with stored instructions implementing the method, wherein the instructions, when executed by the processor carry out steps of the method. The method comprises transmitting frequency modulated continuous wave (FMCW) in a radio frequency (RF) band over a sequence of pulse repetition intervals (PRI); collecting radar measurements of the scene sampled in a time-frequency domain within an intermediate frequency (IF) bandwidth to which reflection of the transmitted FMCW is shifted by mixing with a copy of the FMCW; transforming the radar measurements into range-doppler space to produce measurements of different segments of the scene for different range-doppler bins formed by intersections of different range bins with different Doppler bins; classifying a presence of the hypothetical transmitter at different segments of the scene according to the signal model with the internal classification explaining the measurements for different segments of the scene independently of each other; combining the results of the classification to produce parameters of the object indicated by the results of classification of the presence or absence of the hypothetical transmitter in different segments of the scene; and outputting the parameters of the object.

Accordingly, yet another embodiment discloses a non-transitory computer-readable storage medium embodied thereon a program executable by a processor for performing a method for detecting an object in a scene. The method comprises transmitting frequency modulated continuous wave (FMCW) in a radio frequency (RF) band over a sequence of pulse repetition intervals (PRI); collecting radar measurements of the scene sampled in a time-frequency domain within an intermediate frequency (IF) bandwidth to which reflection of the transmitted FMCW is shifted by mixing with a copy of the FMCW; transforming the radar measurements into range-doppler space to produce measurements of different segments of the scene for different range-doppler bins formed by intersections of different range bins with different Doppler bins; classifying a presence of the hypothetical transmitter at different segments of the scene according to a signal model, wherein the signal model with an internal classification that explains measurements corresponding to a segment of the scene defined by relative distance and relative velocity with respect to an ego-transmitter as a combination of an optional transmission of a hypothetical transmitter with a structure of the ego-transmitter and located within the segment of the scene to the ego-receiver and a mandatory transmission from an interfering transmitter with unknown structure and located within the segment of the scene to an ego-receiver; combining the results of the classification to produce parameters of the object indicated by the results of classification of the presence or absence of the hypothetical transmitter in different segments of the scene; and outputting the parameters of the object.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 2A illustrates a binary hypothesis problem, according to some embodiments of the present disclosure.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
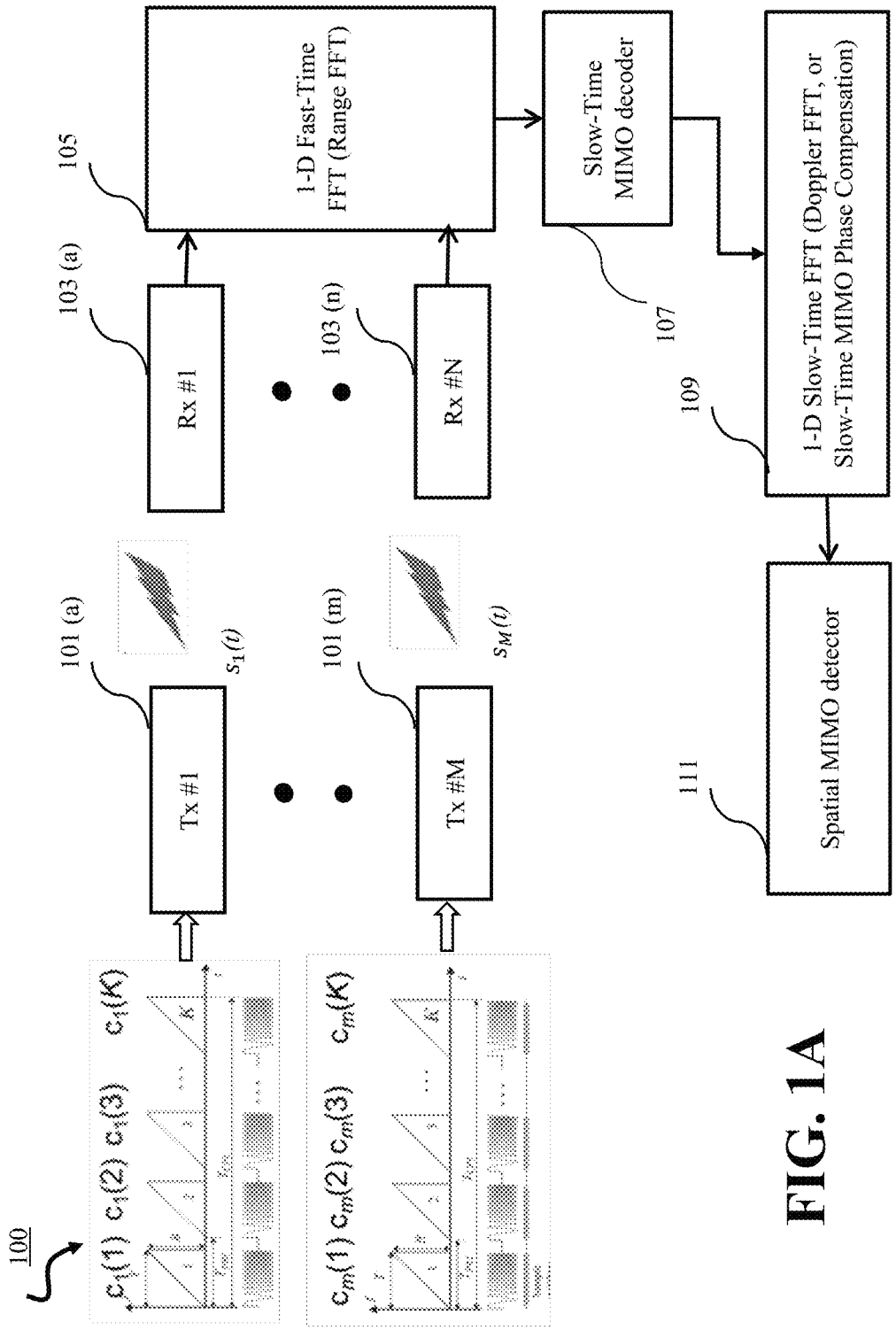
FIG. 1A illustrates a multiple-input multiple-output (MIMO) radar system architecture with codes for detection of an object in a scene, according to some embodiments of the present disclosure.

FIG. 1A illustrates an architecture of a slow-time multiple-input multiple-output (MIMO) radar system 100 for detection of an object in a scene, according to some embodiments of the present disclosure. The MIMO radar system 100 is configured to detect an object in a scene. The object, for example, may be a vehicle, pedestrian, a tree, and the like. The MIMO radar system 100 includes an ego-transmitter with a set of M transmitters 101(a)-101(m) and an ego-receiver with a set of N receivers 103(a)-103(n). Each transmitter sends a train of coded waveform pulses and the same pulse is repeated over time, K times for K pulses.

The set of M transmitters 101(a)-101(m) and the set of N receivers 103(a)-103(n) extend dimensions of the MIMO radar system 100 to create a virtual array, where the virtual array comprises unique combinations of the pairs of transmitter and receivers (for example, Tx#1 and Rx#1, Tx#2 and Rx#1, and the likes) to measure reflections of transmissions. Further, the MIMO radar system 100 includes a memory (not shown in the figure). The memory may include random access memory (RAM), read only memory (ROM), flash memory, or any other suitable memory systems. Additionally, in some embodiments, the memory may be implemented using a hard drive, an optical drive, a thumb drive, an array of drives, or any combinations thereof. The MIMO radar system 100 further includes a processor (not shown in the figure). The processor may be a single core processor, a multi-core processor, a computing cluster, or any number of other configurations.

The MIMO radar system 100 uses a frequency modulated continuous wave (FMCW). To that end, the MIMO radar system 100 includes a signal generator (not shown in the figure) that generates a radar signal or FMCW pulses that are provided to each transmitter of the M transmitters. Each pulse comprises multiple frequencies increasing over time to create a signal sweep as illustrated in the FIG. 1A (specifying in the figure). Further, each transmitter transmits a set of FMCW to illuminate the scene and to form radar measurements. The pulses are transmitted in all the directions. In an example embodiment, the pulses generated by the signal generator may be a chirp signal that is to be transmitted as the radar signal for object detection. As the transmitted signal is constantly varying in frequency, echo has a slightly different frequency compared to the signal being transmitted at that moment. A difference between these frequencies is directly proportional to an echo delay (i.e. a distance from the transmitter to the object), which enables a level to be accurately measured. Further, the set of N receivers 103(a)-103(n) are configured to receive the reflected echo signals or reflections of the transmissions. An advantage of the FMCW signaling scheme is that object information can be efficiently saved in a beat signal by multiplying the reflected signal with source FMCW pulse with a low analog-to-digital (ADC) sampling rate.

Some embodiments are based on the recognition that reflections corresponding to all the signals transmitted by the set of M transmitters that are received at each receiver of the N receivers are to be considered together to determine an angle of the object, where the angle of the object may be used to determine spatial location of the object. However, the transmissions corresponding to all the M transmitters may interfere with each other.

To address this issue, the MIMO radar system 100 uses a coding scheme (for example, an orthogonal coding scheme) to minimize the interference, where the frequency modulated pulses of different transmitters are encoded on pulse-by-pulse basis with orthogonal codes and decoded with corresponding orthogonal codes for each transmitter-receiver pair of the virtual array. According to the coding scheme, the pulses transmitted by each transmitter are multiplied with K codes c(1) to c(K). As can be observed in the figure, the FMCW pulses transmitted by the transmitter #1 which when coded with K codes can be represented as $c_1(1)$ to $c_1(K)$, similarly for M-th transmitter the coded FMCW pulses are represented as $c_M(1)$ to $c_M(K)$.

Further, these pulses are reflected from the object. The receivers are configured to receive the reflected signals. The reflected signals received are referred to as radar measurements. On reception of the reflected signals, each receiver may use the coding scheme to decode the received signal and to obtain a signal corresponding to each unique pairwise transmission. After decoding, the receiver may determine parameters of the object such as a radial velocity, a spatial angle, and a distance to the object. In an embodiment, to determine the parameters of the object, the reflected signals are processed via 1-D fast time FFT 105, a slow time MIMO decoder 107, 1-D Slow-Time FFT 109, and a spatial MIMO detector 111.

The MIMO radar system 100 may be installed in a vehicle for detecting objects around the vehicle. Such an embodiment is explained below with reference to FIG. 1B.

Figure 1B:
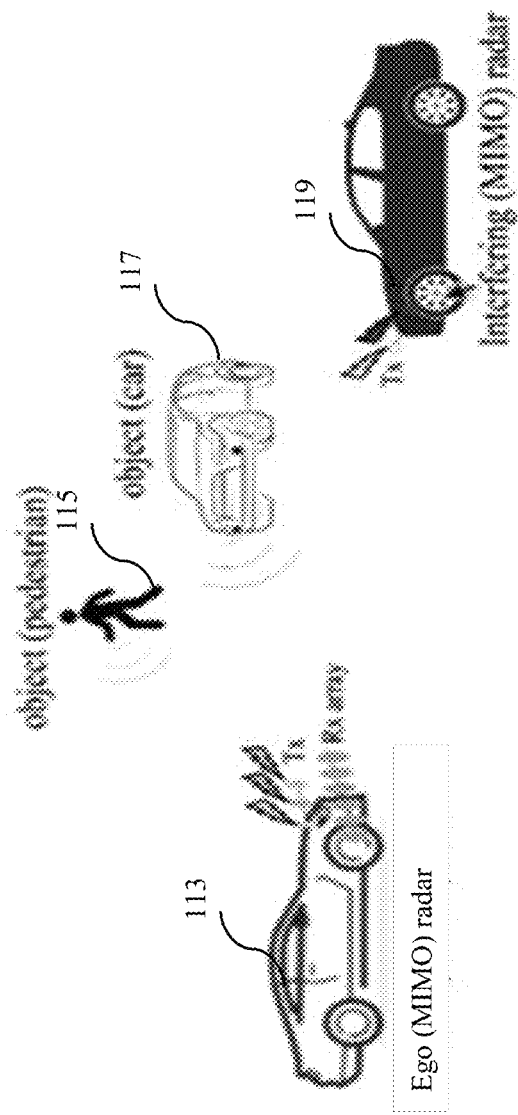
FIG. 1B illustrates a vehicle installed with the MIMO radar system, according to some embodiments of the present disclosure.

FIG. 1B illustrates a vehicle 113 installed with the MIMO radar system 100, according to some embodiments of the present disclosure. The MIMO radar system 100 installed in the vehicle 113 is referred as an ego radar. Here, the MIMO radar system 100 is configured to detect objects in the scene, such as a pedestrian 115 and a car 117. The objects 115 and 117 may be stationary or moving. The set of receivers 103(a)-103(n) of the MIMO radar system 100 receive reflections of the transmitted signals (i.e. the coded pulses/reference signals) from the objects 115 and 117.

Each receiver receives a signal that is a superposition of the reflections of the multiple signals transmitted by the set of transmitters i.e., each receiver receives a combined signal, where each signal of the combined signal corresponds to reflections of all the transmitted signals. In order to detect the objects 115 and/or 117, in some embodiments, the MIMO radar system 100 (or the ego radar) is configured to separate each waveform of reflection of the transmitted signal from the combined signal that is a superposition of all reflected transmitted signals.

Some embodiments are based on the recognition that the MIMO radar system 100 can utilize the orthogonal codes that are used at the set of transmitters 101(a)-101(m) to achieve the waveform separation at the set of receivers 103(a)-103(n). To that end, each receiver is configured to multiply the received combined signal with the corresponding orthogonal code used by the transmitter corresponding to that receiver. Due to the property of orthogonality of the codes, multiplication of two different codes will result in a zero value ideally, whereas multiplication with the same code results in a non-zero value.

Using this property of orthogonality, each receiver can separate reflection waveform corresponding to the reference signal transmitted by each transmitter, from the combined signal. However, a perfect waveform separation is unlikely when an interfering waveform arrives at the receiver with a different set of codes, i.e. in some waveform separation residuals are still left in the separated reflection waveform. The residuals may be due to an interfering radar 119 present in the scene. In particular, the residuals are due to signals transmitted by a set of transmitters of the interfering radar 119. In an embodiment, the interfering radar may also be a MIMO radar.

Figure 1C:
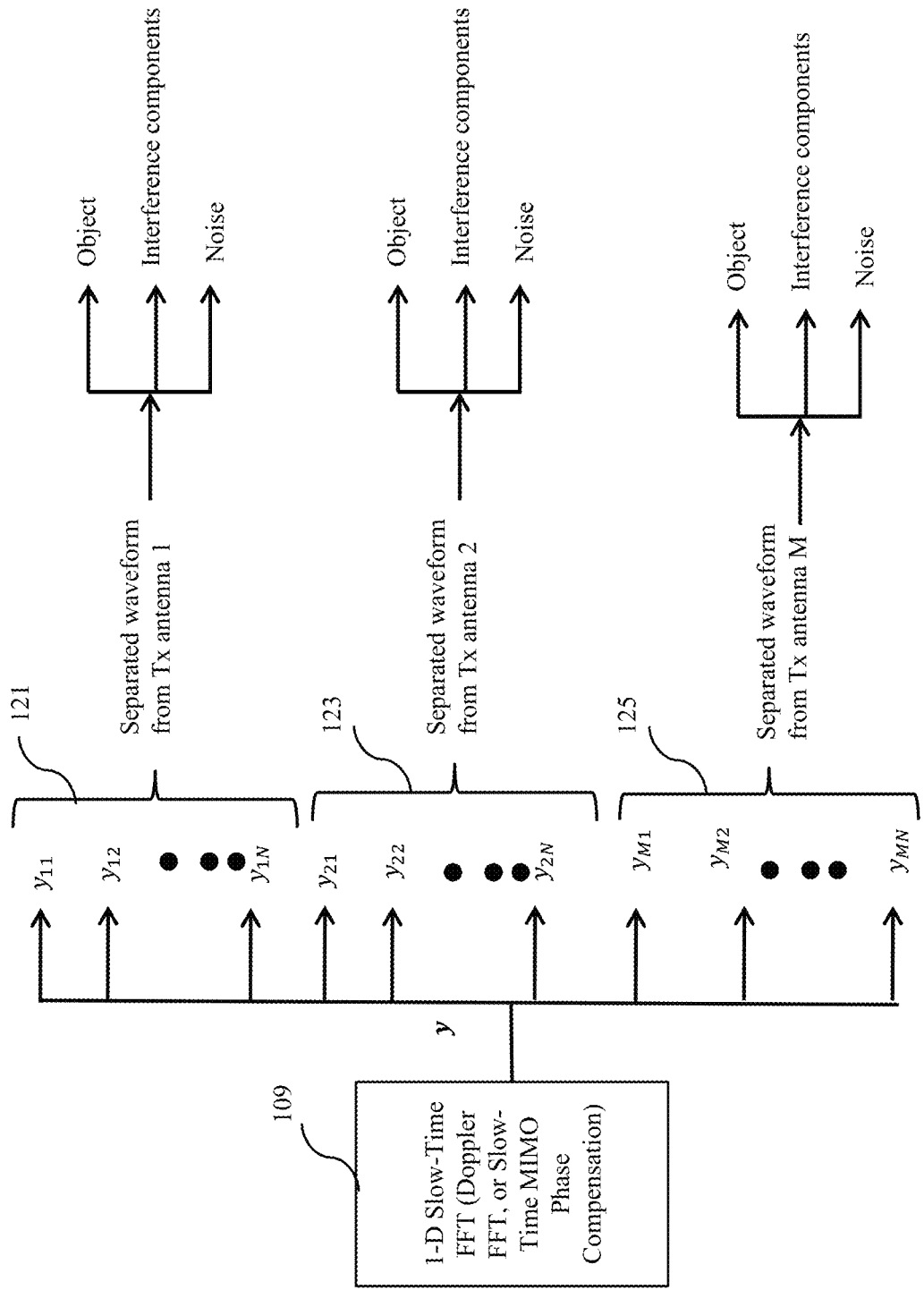
FIG. 1C illustrates various components present in separated waveforms at the MIMO radar system, according to some embodiments of the present disclosure.

FIG. 1C illustrates various components present in the separated waveforms, according to some embodiments of the present disclosure. Each of separated waveforms 121, 123, and 125, includes the reflections from the object, an interference component (i.e., the residual due to the interfering radar 119), and noise. If the interference component, i.e., the residuals due to the interfering radar 119, is not considered for detecting the objects 115 and 117, an accuracy of detection of the objects 115 and 117 may be degraded.

To that end, some embodiments are based on a recognition that a signal model for processing the radar measurements should include (1) an object signal model for the reflections of the transmitted signals forming the radar measurements and (2) an interference signal model for the interference due to the interfering radar 119.

The object signal model may be given as $$y = b a_t \otimes a_r,$$

where $a_t \triangleq [1, \ldots, e^{-j2\pi f_{\phi t}(M-1)}]^t$ is the MIMO radar system's 100 transmitter steering vector (also referred to as an ego-transmitter steering vector) if a uniform linear array (ULA) of antennas is used for transmitting the waveforms, and $a_r \triangleq [1, \ldots, e^{-j2\pi f_{\phi r}(N-1)}]^t$ is the MIMO radar system's 100 receiver steering vector from the object (also referred to as an ego-receiver steering vector) if a ULA of antennas is used for receiving the waveforms.

In some embodiments, $a_t$ is a function of a relative angle between each transmitter of the set of transmitters and the object (e.g., the car 117), a wavelength of the transmitted signal, and a relative distance between the two consecutive transmitter elements of the set of transmitters 101(a)-101(m). Similarly, $a_r$ is a function of a relative angle between each receiver of the set of receivers and the object, a wavelength of the received signal, and a relative distance between the two consecutive receiver elements of the set of receivers 103(a)-103(n). Such an object signal model is possible due to the representation of the reflection from the object in the scene as radar transmission from a hypothetical transmitter having the structure of the MIMO radar and co-located with the object.

Some embodiments are based on the realization that the residual due to the interfering radar 119 can be formulated as Kronecker product of the interfering radar's 119 transmitter steering vector (also referred to as an interfering-transmitter steering vector) and the MIMO radar system's 100 receiver steering vector at the angle of the interfering radar. To that end, the interference signal model may be given as $$y = \tilde{a}'_t \otimes \tilde{a}_r,$$

$\tilde{a}'_t \triangleq [\tilde{a}'_{t,0}, \tilde{a}'_{t,1}, \ldots, \tilde{a}'_{t,M-1}]^T$ is the interfering radar's 119 transmitter steering vector that is a function of interfering radar parameters (e.g., FMCW configuration parameters, transmitting antenna geometry parameters, the set of MIMO codes, and relative transmitting time offset w.r.t. the MIMO radar), and $\tilde{a}_r \triangleq [1, e^{-j2\pi \tilde{f}_{\phi r}}, \ldots, e^{j2\pi \tilde{f}_{\phi r}(N-1)}]^T$ is the MIMO radar system's 100 receiver steering vector at the angle of the interfering radar.

Notably, the receiving steering vectors for the MIMO radar system 100 and the interfering radar 119 have the same structure but may modify the same or different angles. In other words, the receiving steering vectors for the MIMO radar system 100 and the interfering radar 119 are functions of the unknown angles and different embodiments may impose the constraint on having the same angles to explain the radar measurements or relaxing this constraint. Such flexibility allows different embodiments either reduce the computational burden of evaluation of the radar measurements or introduce fewer assumptions for increased accuracy.

Given the object and interference signal models, a spatial-domain object detection under mutual interference is formulated as a binary hypothesis problem. FIG. 2A illustrates a binary hypothesis problem 201, according to some embodiments of the present disclosure. In an embodiment, binary hypothesis problem 201 is given as $$\begin{cases} H_0, & y = \tilde{a}'_t \otimes \tilde{a}_r + z \\ H_1, & y = b a_t \otimes a_r + \tilde{a}'_t \otimes \tilde{a}_r + z \end{cases},$$

where y is a complex-valued range-Doppler spectrum at a given range-Doppler bin defining a segment of the scene, b is a complex-valued unknown object amplitude, z is noise. First hypothesis $H_0$ 203 defines that the separated waveform includes only the residual due to the interference, and the noise (i.e. no object is present at the assumed transmitting and receiving angles). Second hypothesis $H_1$ 205 defines that the separated waveform includes 1) the object at certain angles; 2) the residual due to the interference; and 3) the noise. Additionally, the second hypothesis 205 represents the signal model as a combination of the object signal model and the interference signal model.

The binary hypothesis problem 201 is solved for each range-doppler bin. For instance, the analysis of the scene can be transformed into the range-Doppler frequency domain and the binary hypothesis problem 201 is solved separately for each range-doppler bin and for each quantized angle within the range-doppler bin. However, the binary hypothesis problem 201 includes many unknowns which makes the spatial-domain object detection under the interference challenging. For example, object's complex amplitude 'b' 207 is unknown, the MIMO radar system's 100 receiver steering vector from the interfering radar $\tilde{a}_r$ 209 is unknown, and the interfering radar's 119 transmitter steering vector $\tilde{a}'_t$ 211 is unknown. Some embodiments are based on the realization that the MIMO radar system's 100 receiver steering vector from the interfering radar $\tilde{a}_r$ can be assumed to be known. Such an assumption is valid and is based on an observation that $\tilde{a}_r$ shares the same structure, i.e., a Fourier vector, as the steering vector $a_r$ at an angle of the interference. The interference angle can be estimated when the MIMO radar system 100 does not actively transmit but passively detect the interference, e.g., in the MIMO radar system's idle duration between two coherent processing intervals (CPIs). Thus, $\tilde{a}_r$ is known and $\tilde{a}'_t$ is unknown.

To that end, solving the binary hypothesis problem 201 at a certain quantized angle within the range-doppler bin implies determining the presence or absence of the object at the certain quantized angle while assuming a position of the interference radar at each of the other quantized angles in the range-doppler bin. The absence or presence of the object can be represented as a result of a binary classification.

As a result, radar measurements of a specific range-Doppler bin coming from a specific angle can be explained by just two unknowns 213 and 211. The first unknown 213 is a result of a binary classification governing the presence or the absence of an object having a state corresponding to the specific range-Doppler bin and the specific angle, which define a location and velocity of the object. The second unknown 211 is a structure of the transmitting interference radar, i.e., the interfering radar's 119 transmitter steering vector $\tilde{a}'_t$. This unknown structure can capture the entire versatility of the nature of the interference.

In such a manner, some embodiments define a signal model with an internal classification that explains the radar measurements of the range-Doppler bin for the unknown angles. For each angle, the signal model explains the corresponding radar measurements as a combination of

- an optional transmission of the known transmitter to the known receiver, e.g., the object reflected waveform due to the waveform transmitted from the MIMO radar with known parameters, and
- a mandatory transmission of an unknown transmitter to the same known receiver, e.g., the interfering waveform transmitted from the interfering radar with unknown parameters.

Because the optional transmission is defined by the results of the binary classification, such a classification is referred to herein as an internal classification because it explains only a portion of the signal model. However, the results of the binary classification are what embodiments of the present disclosure aim to determine to explain the scene. In such a manner, processing of the radar measurements can be reduced to a classification problem.

The binary hypothesis problem 201 is formulated and solved by the spatial MIMO detector 111.

Figure 2B:
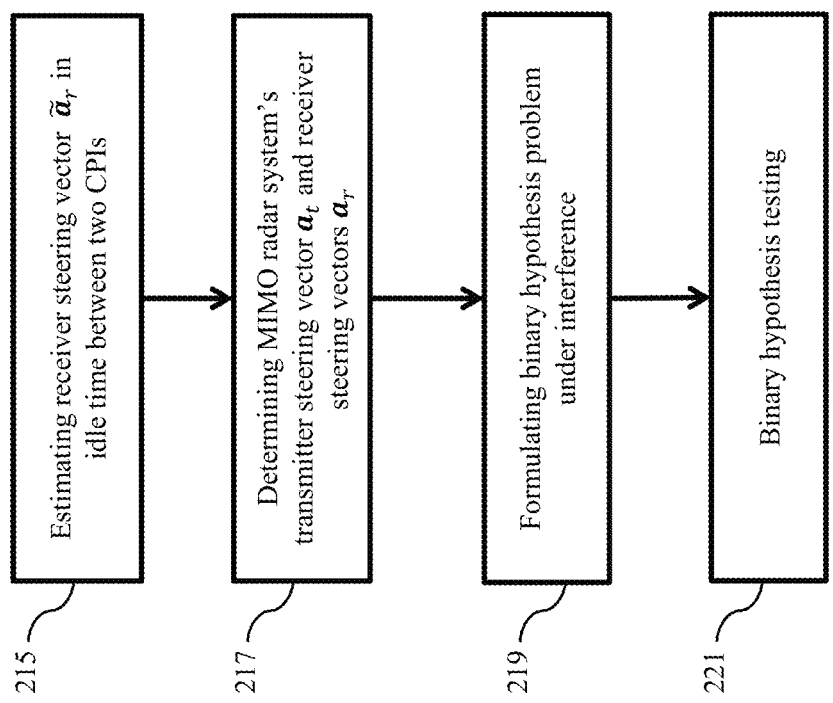
FIG. 2B illustrates a block diagram illustrating steps executed by a spatial MIMO detector, according to some embodiments of the present disclosure.

FIG. 2B shows a block diagram illustrating steps executed by the spatial MIMO detector 111, according to some embodiments of the present disclosure.

At block 215, the MIMO radar system's 100 receiver steering vector $\tilde{a}_r$ from the interfering radar is estimated in the idle duration between two CPIs. At block 217, the MIMO radar system's 100 transmitter steering vector $a_t$, and the MIMO radar system's 100 receiver steering vector $a_r$ from the object are determined. At block 219, the binary hypothesis problem 201 under the interference is formulated. At block 221, binary hypothesis testing is carried out.

Figure 2C:
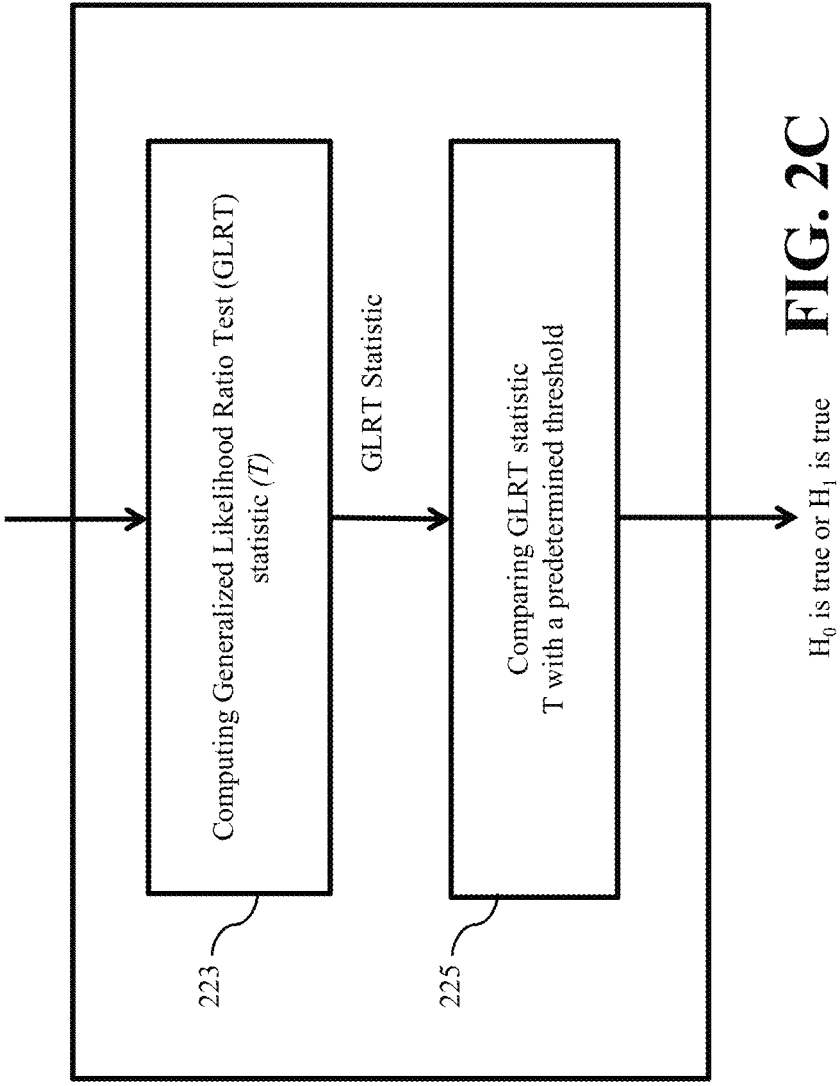
FIG. 2C illustrates a schematic for binary hypothesis testing, according to some embodiments of the present disclosure.

FIG. 2C shows a schematic for the binary hypothesis testing, according to some embodiments of the present disclosure. The binary hypothesis testing refers to solving the binary hypothesis problem 201. According to some embodiments, a generalized likelihood ratio test (GLRT) algorithm may be used to solve the binary hypothesis problem and determine the presence of the object in the spatial domain. At block 223, a GLRT statistic is computed based on separated waveform on the virtual array, the MIMO radar system's transmitter steering vector $a_t$ and the receiver steering vectors $a_r$, and the receiver steering vector $\tilde{a}_r$ at the angle of the interfering radar. The computation of the GLRT statistic is explained in detail in FIG. 2D. At block 225, the GLRT statistic is compared with a predetermined threshold. The predetermined threshold is based on a number of transmitters and receivers. If the GLRT statistic is greater than the predetermined threshold, then second hypothesis is true. If the GLRT statistic is less than the predetermined threshold, the first hypothesis is true.

Figure 2D:
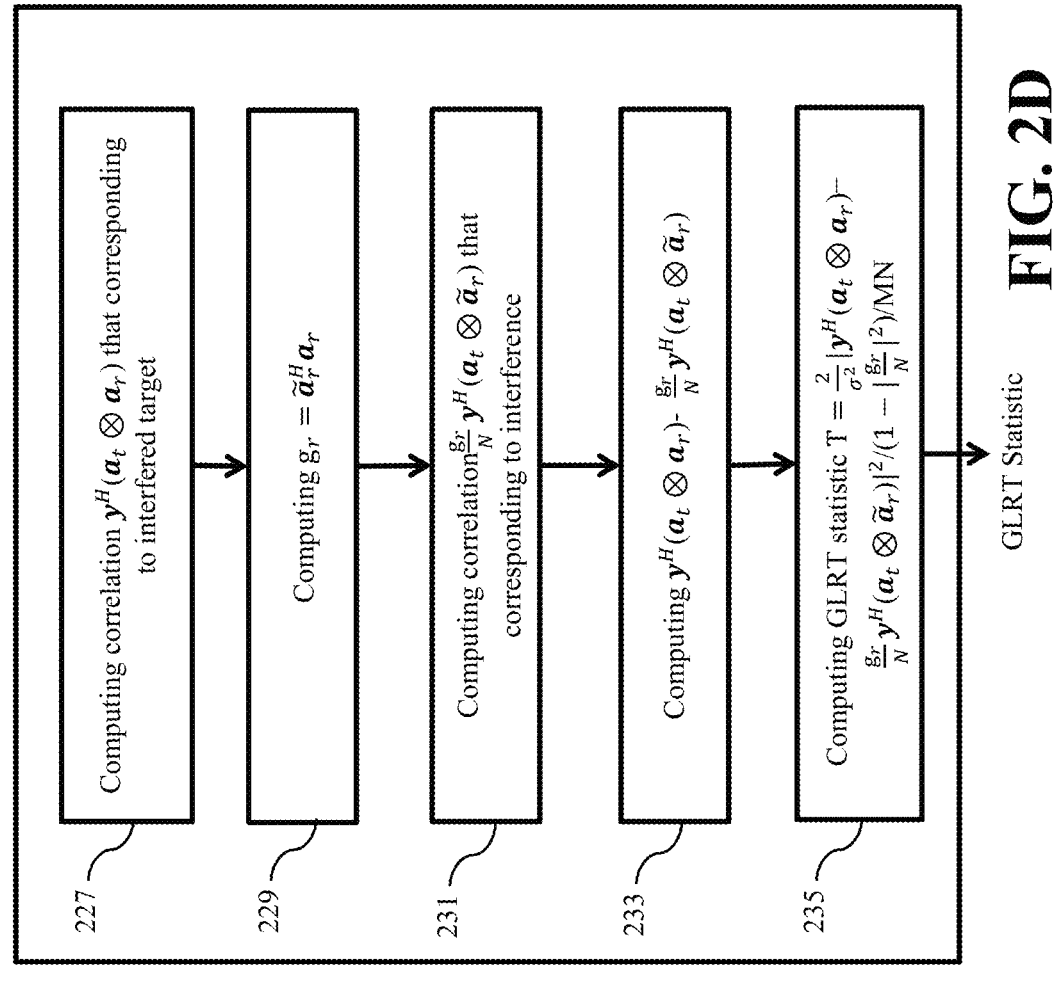
FIG. 2D shows a block diagram for computation of a generalized likelihood ratio test (GLRT) statistic, according to some embodiments of the present disclosure.

FIG. 2D shows a block diagram for computation of the GLRT statistic, according to some embodiments of the present disclosure. At block 227, a correlation $y^H(a_t \otimes a_r)$ corresponding to interfered target is computed. At block 229, $g_r = \tilde{a}_r^H a_r$ is computed. At block 231, a correlation $g_r/N y^H(a_t \otimes \tilde{a}_r)$ corresponding to the interference is computed.

At block 233, $$y^H(a_t \otimes a_r) - \frac{g_r}{N} y^H(a_t \otimes \tilde{a}_r)$$

is computed. At block 235, the GLRT statistic is computed as $$T = \frac{2}{\sigma^2} \left| y^H(a_t \otimes a_r) - \frac{g_r}{N} y^H(a_t \otimes \tilde{a}_r) \right|^2 / \left(1 - \left|\frac{g_r}{N}\right|^2\right) / MN$$

Figure 3:
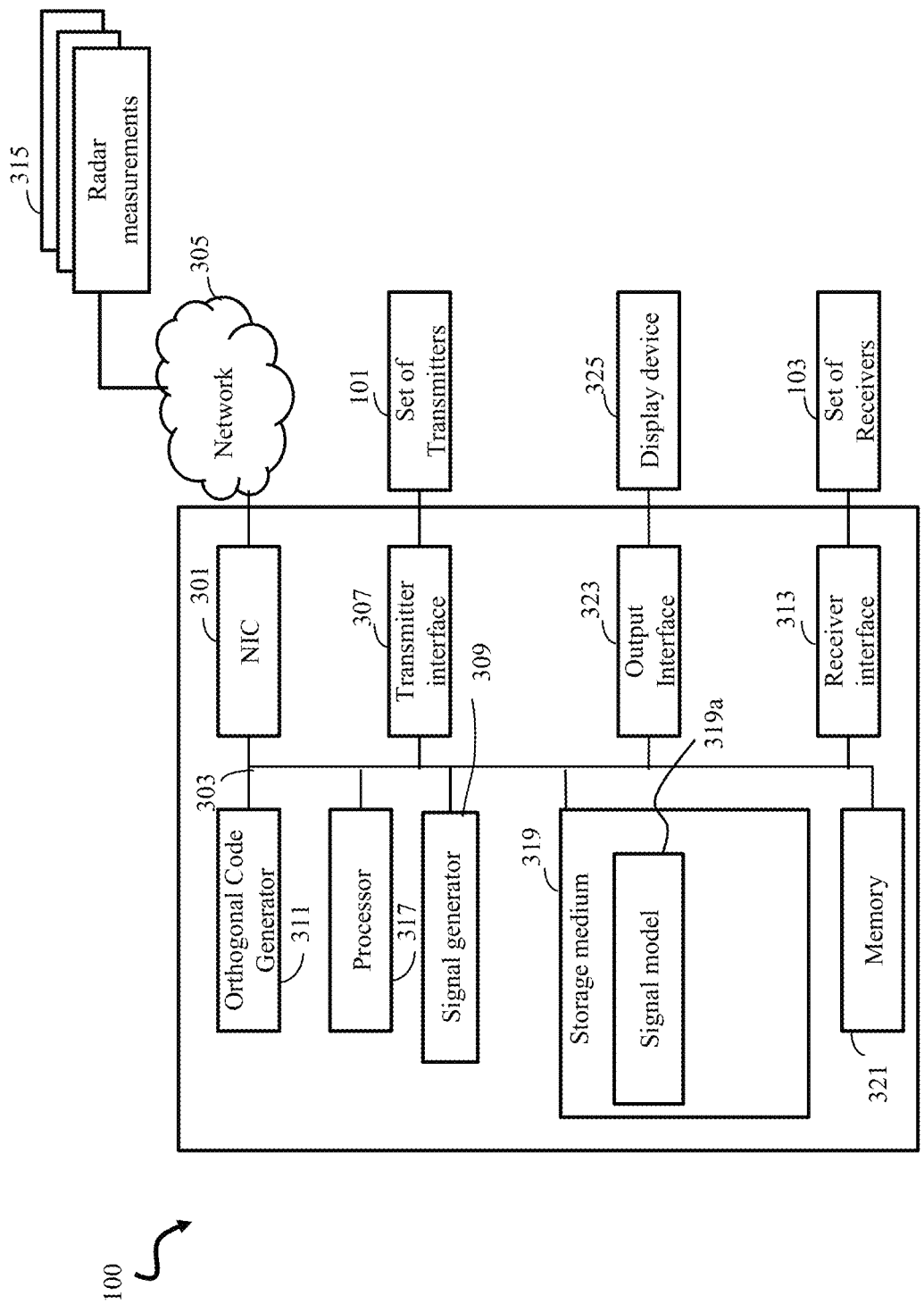
FIG. 3 illustrates a block diagram of the MIMO radar system, in accordance with some embodiments of the present disclosure.

FIG. 3 illustrates a block diagram of the MIMO radar system 100, in accordance with some embodiments. The MIMO radar system 100 can have a number of interfaces connecting the MIMO radar system 100 with other systems and devices. For example, a network interface controller (NIC) 301 is adapted to connect the MIMO radar system 100 through a bus 303 to a network 305 connecting the MIMO radar system 100 with sensing devices. The MIMO radar system 100 includes a transmitter interface 307 configured to command to the set of transmitters 101 to transmit FMCW pulses in a radio frequency (RF) band over a sequence of pulse repetition intervals (PRI). The transmitter interface 307 is in communication with a signal generator 309 that generates the FMCW pulses.

Further, an orthogonal code generator 311 is used to generate different orthogonal codes which are multiplied with the FMCW pulses associated with each transmitter of the set of transmitters 101. The MIMO radar system 100 is connected to the set of receivers 103 via a receiver interface 313. The set of receivers is configured to collect radar measurements 315 of the scene, through the network 305. The radar measurements 315 of the scene are sampled in a time-frequency domain within an intermediate frequency (IF) bandwidth to which reflection of the transmitted FMCW is shifted by mixing with a copy of the FMCW.

Further, the MIMO radar system 100 includes a processor 317 configured to execute instructions stored in a storage medium 319 as well as a memory 321. The processor 317 can be a single core processor, a multi-core processor, a computing cluster, or any number of other configurations. The memory 321 can include random access memory (RAM), read only memory (ROM), flash memory, or any other suitable memory systems. The storage medium 319 may include random access memory (RAM), read only memory (ROM), flash memory, or any other suitable memory systems. The processor 317 can be connected through the bus 503 to one or more input and/or output (I/O) devices.

The storage medium 319 is configured to store a signal model 319a with an internal classification that explains measurements corresponding to a segment of the scene defined by relative distance and relative velocity with respect to the ego-transmitter as a combination of an optional transmission of a hypothetical transmitter with a structure of the ego-transmitter and located within the segment of the scene to the ego-receiver and a mandatory transmission from an interfering transmitter with unknown structure and located within the segment of the scene to the ego-receiver. In an embodiment, the signal model 319a with the internal classification explains the measurements for different quantized angles at a range-doppler bin as a sum of a binary classified Kronecker product of an ego-transmitter steering vector and an ego-receiver steering vector modifying an unknown angle and a Kronecker product of an interfering-transmitter steering vector and the ego-receiver steering vector modifying the unknown angle. Alternatively, in some embodiments, the signal model with the internal classification explains the measurements of the segment of the scene for different angles at a range-doppler bin as a sum of a binary classified Kronecker product of an ego-transmitter steering vector and an ego-receiver steering vector modifying a first unknown angle and a Kronecker product of an interfering-transmitter steering vector and the ego-receiver steering vector modifying a second unknown angle.

The processor 317 is configured to transform the radar measurements into range-doppler space to produce measurements of different segments of the scene for different range-doppler bins formed by intersections of different range bins with different Doppler bins. The processor 317 is further configured to classify a presence of the hypothetical transmitter at different segments of the scene according to the signal model with the internal classification explaining the measurements for different segments of the scene independently of each other. The processor 317 is further configured to combine the results of the classification to produce parameters of the object indicated by the results of classification of the presence or absence of the hypothetical transmitter in different segments of the scene, and output the parameters of the object.

Further, in an embodiment, the processor 317 is further configured to evaluate measurements of different segments of the scene independently from each other, wherein for evaluating the measurements of the segment, the processor 317 is further configured to tests the presence of the hypothetical transmitter for each of different values of the first unknown angle to explain the measurements of the segment for different values of the second unknown angle. In some other embodiments, the processor 317 is further configured to evaluate the measurements of the segment statistically over multiple pulse repetition intervals using a generalized likelihood ratio test (GLRT).

The MIMO radar system 100 includes an output interface 323 configured to output the parameters associated with the object. The parameters include at least one of radial velocity, a spatial angle, and a distance to the object. The output interface 323 may output the parameters on a display device 325, store the parameters into a storage medium and/or transmit the parameters over the network 305. For example, the MIMO radar system 100 can be linked through the bus 303 to a display interface adapted to connect the MIMO radar system 100 to the display device 325, such as a computer monitor, camera, television, projector, or mobile device, among others. Additionally, in some embodiments, the MIMO radar system 100 is connected to an application interface adapted to connect the MIMO radar system 100 to equipment for performing various tasks.

In an example embodiment, an automobile may include the MIMO radar system 100. The automobile may be an autonomous driving vehicle. While the automobile is travelling on a highway or parking in a parking space, the MIMO radar system 100 detects objects (such as vehicles, pedestrians, or the likes). Based on the detected objects, the autonomous vehicle may control its navigation. Such an embodiment is described below in FIGS. 4A and 4B.

Figure 4A:
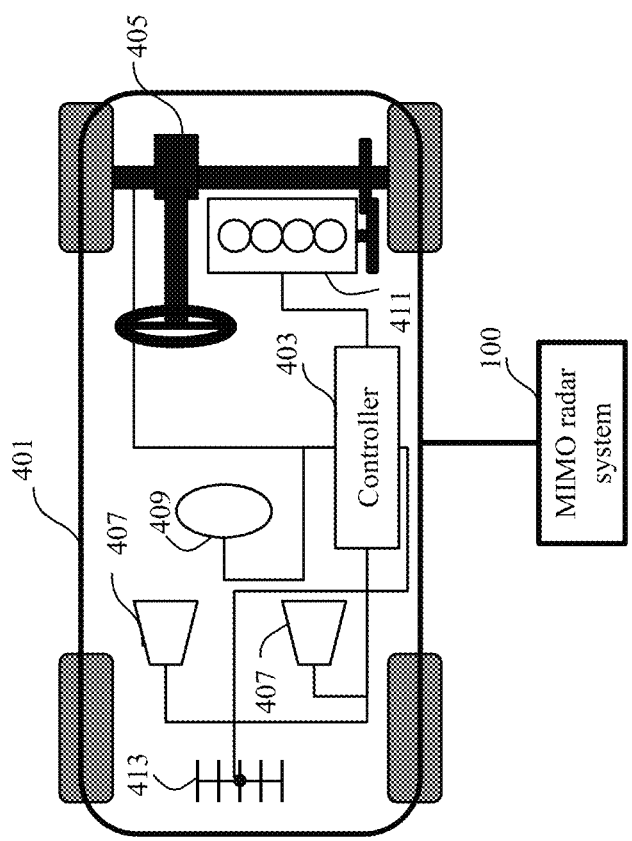
FIG. 4A illustrates a schematic of a vehicle communicatively coupled to the MIMO radar system, according to an embodiment of the present disclosure.

FIG. 4A shows a schematic of a vehicle 401 communicatively coupled to the MIMO radar system 100, according to an embodiment of the present disclosure. The vehicle 401 may be any type of wheeled vehicle, such as a passenger car, bus, or rover. Also, the vehicle 401 can be an autonomous or semi-autonomous vehicle. In one embodiment, a steering system 405 is controlled by a controller 403. Additionally or alternatively, the steering system 405 may be controlled by a driver of the vehicle 401.

In some embodiments, the vehicle 401 may include an engine 411, which can be controlled by the tracker 403 or by other components of the vehicle 401. In some embodiments, the vehicle 401 may include an electric motor in place of the engine 411 and can be controlled by the tracker 403 or by other components of the vehicle 401. The vehicle 401 can also include one or more sensors 407 to sense the surrounding environment. In some embodiments, the vehicle 401 includes one or more sensors 409 to sense its current motion parameters and internal status. Examples of the one or more sensors 409 include global positioning system (GPS), accelerometers, inertial measurement units, gyroscopes, shaft rotational sensors, torque sensors, deflection sensors, pressure sensor, and flow sensors. The vehicle 401 may be equipped with a transceiver 413 enabling communication capabilities of the controller 403 through wired or wireless communication channels with the controller 109. For example, through the transceiver 413, the controller 403 receives parameters of an object from MIMO radar system 100.

Figure 4B:
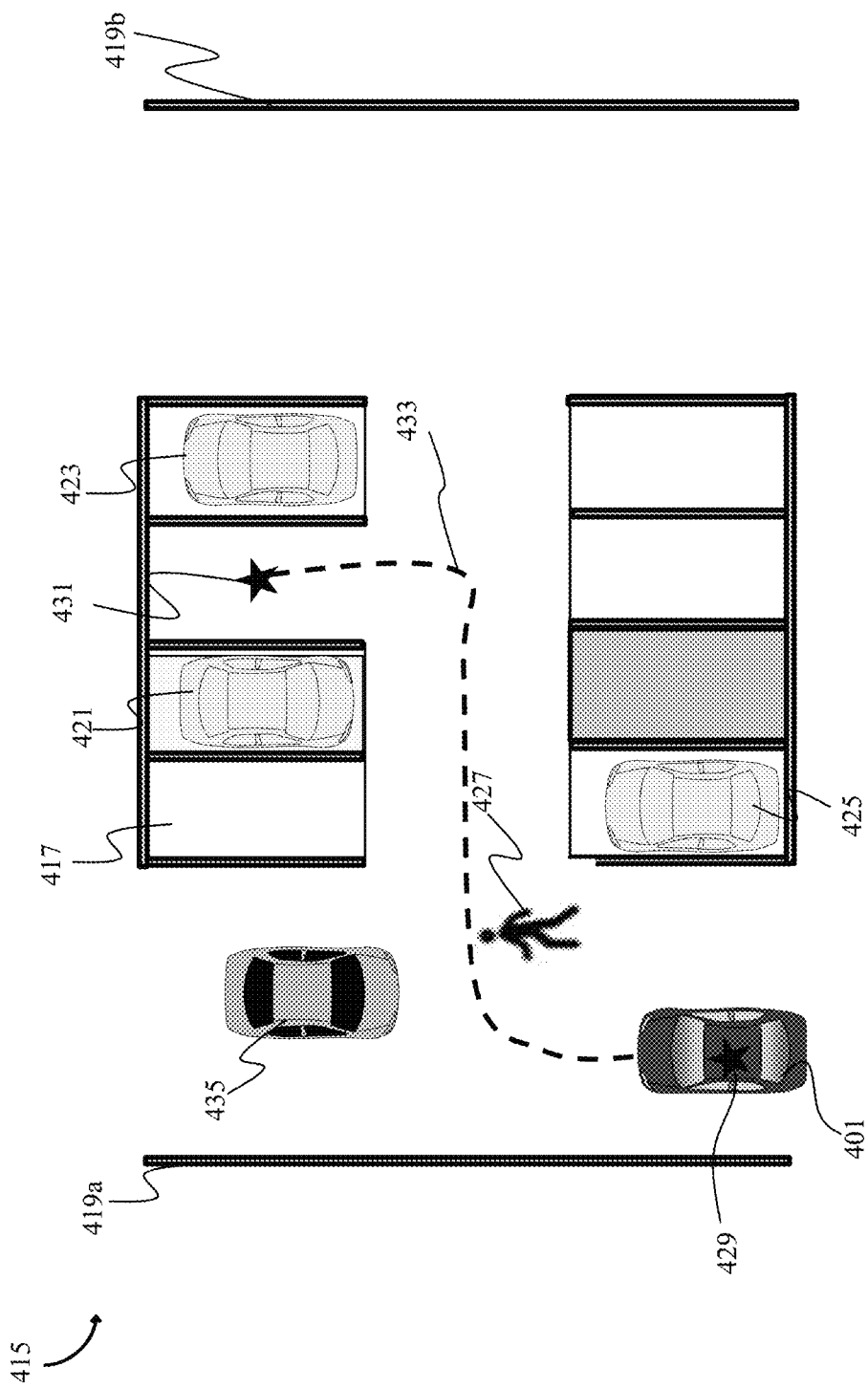
FIG. 4B illustrates parking of the vehicle in a parking space, according to an embodiment of the present disclosure.

FIG. 4B illustrates parking of the vehicle 401 in a parking space 415, according to an embodiment of the present disclosure. The parking space 415 includes parking spots, such as a spot 417, for parking vehicles. The parking space 415 is bounded by boundaries 419a and 419b. The parking space 415 further includes one or multiple objects, such as vehicles 421, 423, 425, and a passerby 427, with which the vehicle 401 should not collide.

The vehicle 401 is at a starting point 429 and needs to be parked at a target parking spot 431, without colliding with the vehicles 421, 423, 425, and 427, and the boundaries 419a and 419b. According to some embodiments, the controller 403 is configured to track a motion path 433 for controlling motion of the vehicle 401 from the starting point 429 to the target parking spot 431. The parking space 415 also includes an interfering radar associated with a vehicle 435, which causes mutual interference. The MIMO radar system 100 associated with the vehicle 401 accurately determines parameters of the object, e.g., the passerby 427, under the mutual interface.

Further, the MIMO radar system 100 transmits parameters of the passerby 427 to the controller 403. The parameters may include a location of the passerby 4217 or a distance to the passerby 427. Based on the parameters of the passerby 427, the controller 403 generates control inputs to safely track the motion path 433. For example, based on the parameters of the passerby 427, the controller 403 if determines if the passerby 427 intersects with the motion path 433. If the passerby 427 intersects with the motion path 433, the controller 403 generates control inputs to stop or slow down the vehicle 401. The control inputs, for example, include control commands specifying values of one or combination of a steering angle of wheels of the vehicle 401, a rotational velocity of vehicle wheels, and an acceleration of the vehicle 401.

Similarly, while the vehicle 401 is travelling on a road/highway, the MIMO radar system 100 detects one or more objects around the vehicle 401, based on the signal model 319a. The controller 403 may control the motion of the vehicle 401 on the road, based on the one or more detected objects.

The formulation of the signal model 319a is mathematically described below.

Throughout the present disclosure, $(\bullet)^T$, $(\bullet)^*$, and $(\bullet)^H$ represent transpose, conjugate, and conjugate transpose, respectively. $P_H^{195} \triangleq I - H(H^H H)^{-1} H^H$ denotes a projection matrix projecting to a space orthogonal to that spanned by columns of H. $Q_F(\gamma)$ denotes a complementary cumulative distribution function (CCDF) of a distribution F at a value $\gamma$. A rectangular window function $D_{a,b}(t)=1$ if $a \leq t \leq b$, otherwise $D_{a,b}(t)=0$. An indicator function $1[l \in \mathcal{L}]=1$ if $l \in \mathcal{L}$, otherwise $1[l \in \mathcal{L}]0$.

As shown in FIG. 1A, the MIMO radar system 100 of M Tx antennas collocated with N Rx antennas over K pulses on each Tx antenna per coherent processing interval (CPI), is considered. The FMCW waveform of the MIMO radar system 100 is $$s(t) = e^{j\beta t^2} D_{0,T}(t), \quad (1)$$

where $\beta$ is a chirp slope, and T is a pulse duration. RF waveform on Tx antenna m over K pulses is $$s_m(t) = \Sigma_{k=0}^{K-1} c_{k,m} s(t - kT_{PRI}) e^{j2\pi f_c (t - kT_{PRI})} \quad (2)$$

where $c_{k,m}$ is a slow-time MIMO code on the m-th Tx antenna and k-th pulse, $T_{PRI}$ is a pulse repetition interval (PRI), and $f_c$ is a carrier frequency. The incoherent interference of $\tilde{M}$ Tx antennas of the interference radar 119 shares the same waveform expressions as (1) and (2) but with different chirp slope $\tilde{\beta}$, pulse duration $\tilde{T}$, pulse number $\tilde{K}$, PRI $\tilde{T}_{PRI}$, and MIMO code.

Object Signal Model

For an object of range R and velocity v, a round-trip propagation delay from MIMO radar's m-th Tx antenna to its n-th Rx antenna is $$\tau_{m,n}(t) = 2\frac{R + vt}{c} + m\frac{d_t \sin(\phi_t)}{c} + n\frac{d_r \sin(\phi_r)}{c},$$

where $d_t$ and $d_r$ are Tx and Rx antenna element spacing, $\phi_t$ and $\phi_r$ are Tx and Rx angle for the object, and c is a speed of propagation. At the n-th Rx antenna of the MIMO radar 100, the backscattered object signal $\alpha \Sigma_{m=0}^{M-1} s_m(t - \tau_{m,n}(t))$ is mixed with a conjugate of a local oscillator (LO) signal $\Sigma_{k=0}^{K-1} s(t - kT_{PRI}) e^{-j2\pi f_c (t - kT_{PRI})}$ and sampled at $t = kT_{PRI} + l\Delta T$ with $\Delta T$, leading to a dechirped and sampled baseband signal $$a_n^s(l,k) = \alpha'_\tau e^{-j2\pi f_r l} 1[l \in \mathcal{L}^s] \Sigma_{m=0}^{M-1} c_{k,m} e^{-j2\pi (f_d k + f_{\phi_t} m + f_{\phi_r} n)} \quad (3)$$

where $\alpha'_\tau \triangleq \alpha e^{-j2\pi f_c \tau} e^{j\pi \beta \tau^2}$ with $\alpha$ denoting a complex object amplitude, $\mathcal{L}^s \triangleq [\tau/\Delta T, T/\Delta T]$ is a set of fast-time sample indices, $f_{\phi_t} = d_t \sin(\phi_t)/\lambda$ and $f_{\phi_r} = d_r \sin(\phi_r)/\lambda$ are, respectively, a normalized spatial frequency at the Tx and Rx arrays with $\lambda = c/f_c$ denoting a wavelength, $\tau = 2R/c$ is a reference round-trip propagation delay, $f_r \triangleq (\beta\tau + 2v/\lambda)\Delta T$ is a normalized range frequency, and $f_d \triangleq 2f_c T_{PRI} v/c$ is a normalized Doppler frequency. To separate $a_n^s(l,k)$ into M transmitter-corresponding signals, a range FFT is applied to $a_n^s(l,k)$ leading to $$x_n^s(l',k) = \alpha_{l'} \Sigma_{m=0}^{M-1} c_{k,m} e^{-j2\pi f_d k} e^{-j2\pi (f_{\phi_t} m + f_{\phi_r} n)} \quad (4)$$

where $\alpha_{l'} \triangleq \Sigma_{l=0}^{L-1} \alpha'_\tau 1[l \in \mathcal{L}^s] e^{-j2\pi (f_r - l'/L) l}$ is a range response of the object on range bin l'. Then, when $M \leq K$, with an orthogonal MIMO code sequence $c_{k,m} c^*_{k,m} = 1$, $\Sigma_{k=0}^{K-1} c_{k,m} c^*_{k,m'} = 0$, $\forall m' \neq m$ and a near-orthogonality with a Doppler modulation (e.g., the Chu sequence)

$$\max_f \left| \Sigma_{k=0}^{K-1} c_{k,m} c^*_{k,m'} e^{-j2\pi f k} \right| \ll K, \forall m' \neq m, \quad (5)$$

the m-th signal corresponding to the m-th Tx antenna can be decoded as a weighted Doppler FFT, $$y_{m,n}^s(l', k') = \Sigma_{k=0}^{K-1} \left[ x_n^s(l', k) c^*_{k,m} \right] e^{-j2\pi \frac{k'}{K} k} \approx b(l', k') e^{-j2\pi (f_{\phi_t} m + f_{\phi_r} n)}, \quad (6)$$

where $b(l', k') \triangleq \alpha_{l'} \Sigma_{k=0}^{K-1} e^{-j2\pi \left(f_d + \frac{k'}{K}\right)k}$ is a range-Doppler response of the object at range bin l' and Doppler bin k', and a residual from other Tx antennas is ignored. Further, stack $\{y_{m,n}^s(l', k')\}$ into an $MN \times 1$ virtual array for the object at range-Doppler bin (l', k')

$$y^2(l',k') = b(l',k') a_t \otimes a_r \quad (7)$$

where $a_t \triangleq [1, \ldots, e^{-j2\pi f_{\phi_t}(M-1)}]^t$ is the $M \times 1$ ego-transmitter steering vector, and $a_r \triangleq [1, \ldots, e^{-j2\pi f_{\phi_r}(N-1)}]^t$ is the $N \times 1$ Rx ego-receiver steering vector.

Interference Signal Model

Similar to the above object signal model of (4), a range spectrum of the received interference signal on the n-th Rx antenna, l'-th range bin and k-th pulse of the MIMO radar system 100 is $$x_n^i(l', k) = \Sigma_{\tilde{m}=0}^{\tilde{M}-1} \tilde{\alpha}_{l',k,\tilde{m}} e^{-j2\pi \tilde{f}_d k} e^{-j2\pi (\tilde{f}_{\phi_t} \tilde{m} + \tilde{f}_{\phi_r} n)}, \quad (8)$$

where $\tilde{\alpha}_{l',k,\tilde{m}} = \Sigma_{l=0}^{L-1} e^{j\pi(\tilde{\beta}-\beta)(l\Delta T)^2} \Sigma_{\tilde{k}=0}^{\tilde{K}-1} \tilde{\alpha}'_{k,\tilde{k},\tilde{m}} 1\left[l \in \mathcal{L}^i_{k,\tilde{k}}\right] e^{-j2\pi \left(\tilde{f}_{r,k,\tilde{k}} + \frac{l'}{L}\right) l}$ is a range response of the interference at range bin l', pulse k due to the interfering Tx channel $\tilde{m}$, $$\tilde{f}_d = f_c \frac{\tilde{v} T_{PRI}}{c}$$

is a normalized interference Doppler frequency, and $\tilde{f}_{\phi t}$ and $\tilde{f}_{\phi r}$ are normalized Tx and Rx interference spatial frequencies, $\tilde{a}'_{k,\tilde{k},\tilde{m}}$, $\mathcal{L}_{k,\tilde{k}}{}^i$, and $\tilde{f}_{r,k,\tilde{k}}$ are complex amplitude, a set of fast-time samples, and a normalized interference, and initial fast-time frequency of the k-th interference pulse falling into the k-th MIMO radar's 100 pulse. Notice that $\tilde{a}'_{k,\tilde{k},\tilde{m}}$, $\mathcal{L}_{k,\tilde{k}}{}^i$ and $\tilde{f}_{r,k,\tilde{k}}$ depend on interfering radar's system parameters, i.e., slow-time MIMO code, PRI $\tilde{T}_{PRI}$ and chirp slope $\tilde{\beta}$. After MIMO decoding and Doppler FFT, interference spectrum on victim radar's l'-th range bin and k'-th Doppler bin is $$y_{m,n}{}^i(l',k') = \tilde{a}'_{t,m} e^{-j2\pi \tilde{f}_{\phi r} n} \tag{9}$$

where decoded interference Tx steering signal is $$\tilde{a}'_{t,m} = \sum_{\tilde{m}=0}^{\tilde{M}-1} \sum_{k=0}^{K-1} \tilde{\alpha}_{l',k,\tilde{m}} c^*_{k,m} e^{-j2\pi(\tilde{f}_d + \frac{kt}{K})k} e^{-j2\pi \tilde{f}_{\phi t} \tilde{m}}. \tag{10}$$

Further, stacking $\{y_{m,n}{}^i(l', k')\}_{m,n}$ into a vector, an interference range-Doppler spectrum on a MN×1 virtual array may be obtained as $$y^i(l',k') = \tilde{a}'_t \otimes \tilde{a}_r \tag{11}$$

where M×1 interfering-transmitter steering vector and the N×1 interference Rx steering vector given as $$\tilde{a} \triangleq [\tilde{a}'_{t,0}, \tilde{a}'_{t,1}, \ldots, \tilde{a}'_{t,M-1}]^T \tag{12}$$

$$\tilde{a}_r \triangleq [1, e^{-j2\pi \tilde{f}_{\phi r}}, \ldots, e^{-j2\pi \tilde{f}_{\phi r}(N-1)}]^T \tag{13}$$

Given the object and interference signal models over a given range-Doppler bin, the spatial-domain object detection under the mutual interference is formulated as a binary hypothesis testing problem $$\begin{cases} H_0, & y = \tilde{a}'_t \otimes \tilde{a}_r + z \\ H_1, & y = b a_t \otimes a_r + \tilde{a}'_t \otimes \tilde{a}_r + z \end{cases} \tag{14}$$

where y is a complex-valued range-Doppler spectrum at a given range-Doppler bin (l', k'), b is a complex-valued unknown object amplitude, $a_t$ and $a_r$ are given defined below (7), $\tilde{a}'_t$ and $\tilde{a}_r$ are given by (12) and (13), and noise $z \sim \mathcal{CN}(0, \sigma^2 I_{MN})$ with $I_{MN}$ denoting an identity matrix of size MN and $\sigma^2$ denoting an unknown noise power.

The binary hypothesis problem (14) assumes knowledge of $\tilde{a}_r$ but treats $\tilde{a}'_t$ shares as an unknown vector. Such an assumption is based on an observation that $\tilde{a}_r$ shares the same structure, i.e., a Fourier vector, as the ego-transmitter steering vector at the angle of the interference. The interference angle can be estimated when the MIMO radar system 100 does not actively transmit but passively detect the interference, e.g., in the MIMO radar system's 100 idle duration between two CPIs.

If one assumes the perfect knowledge about the interfering-transmitter steering vector $\tilde{a}'_t$ and the steering vector $\tilde{a}_r$, a clairvoyant detector can be derived as $$T^C(y) = \frac{2}{\hat{\sigma}_C^2} \frac{|(y - \tilde{a}'_t \otimes \tilde{a}_r)^H (a_t \otimes a_r)|^2}{MN}, \tag{15}$$

where $$\hat{\sigma}_C^2 = \frac{2}{MN-1} |P^\perp_{\tilde{a}_t \otimes \tilde{a}_r}(y - \tilde{a}'_t \otimes \tilde{a}_r)|^2 \tag{16}$$

is an unbiased estimator of the noise power $\sigma^2$. The clairvoyant detector suggests subtracting the interference signal $\tilde{a}'_t \otimes \tilde{a}_r$ before correlation, as indicated in (15). This fully eliminates the interference $\tilde{a}'_t \otimes \tilde{a}_r$, while keeps object correlation gain $(a_t \otimes a_r)^H (a_t \otimes a_r) = MN$.

Lemma 1—The probabilities of false alarm and detection for the clairvoyant solution in (15) are $$P_{FA}{}^C = Q_{F_{2,2(MN-1)}}(\gamma), P_D{}^C = Q_{F_{2,2(MN-1)}\lambda^C}(\gamma) \tag{17}$$

where $\gamma$ is a detection threshold, $F_{2,2(MN-1)}$ is a F-distribution with 2 and 2(MN-1) degrees of freedom, $F_{2,2(MN-1)}(\lambda^C)$ is a noncentral F-distribution with 2 and 2(MN-1) degrees of freedom and noncentrality parameter $$\lambda^C = 2MN|b|^2/\sigma^2 \tag{18}$$

(17) shows that the clairvoyant detector is a constant false alarm rate (CFAR) detector.

GLRT Detector

Under the assumption that the interfering-transmitter steering vector $\tilde{a}'_t$ is unknown but the interference Rx steering vector $\tilde{a}_r$ is known, the GLRT solution for problem in (14) is solved. Define $$\text{theta}_0 \triangleq \tilde{a}'_t, \text{theta}_1 \triangleq [b, o']^T \tag{19}$$

$$H_0 \triangleq I_M \otimes \tilde{a}_r, H_1 \triangleq [a_t \otimes a_r, H_0] \tag{20}$$

where $\text{theta}_0$ ($\text{theta}_1$) is an unknown vector under $H_0$ ($H_1$) and $H_0$ ($H_1$) is a known matrix under $H_0$ ($H_1$). Then, likelihood functions under $H_0$ and $H_1$ are, respectively, $$p(y; H_0) = \frac{\exp\left[-\frac{1}{\sigma^2}(y - H_0 \text{theta}_0)^H (y - H_0 \text{teta}_0)\right]}{(\pi \sigma^2)^{MN}}, \tag{21}$$

$$p(y; H_1) = \frac{\exp\left[-\frac{1}{\sigma^2}(y - H_1 \text{theta}_1)^H (y - H_1 \text{theta}_1)\right]}{(\pi \sigma^2)^{MN}}. \tag{22}$$

The GLRT statistics is $$T(y) = \frac{\left(\frac{\max_{\text{theta}_1, \sigma^2} p(y; H_1)}{\max_{\text{theta}_0, \sigma^2} p(y; H_0)}\right)^{\frac{1}{MN}} - 1}{1/(MN - M - 1)}, \tag{23}$$

where the likelihood functions maximized over the unknown variables are $$\max_{\text{theta}_0, \sigma^2} p(y; H_0) = \exp(-MN) \left(\frac{\pi}{MN} y^H P^\perp_{H_0} y\right)^{-MN}, \tag{24}$$

$$\max_{\text{theta}_1, \sigma^2} p(y; H_1) = \exp(-MN) \left(\frac{\pi}{MN} y^H P^\perp_{H_1} y\right)^{-MN}, \tag{25}$$

and the projection matrices are $$P_{H_0}^\perp = I_M \otimes P_{\tilde{a}_r}^\perp, \quad (26)$$

$$P_{H_1}^\perp = P_{H_0}^\perp - \frac{a_t \otimes (P_{\tilde{a}_r}^\perp a_r)(a_t \otimes (P_{\tilde{a}_r}^\perp a_r))^H}{|a_t \otimes (P_{\tilde{a}_r}^\perp a_r)|^2}. \quad (27)$$

By (23), (24), (25), (26) and (27), the GLRT statistics is $$T(y) = \frac{2}{\hat{\sigma}^2} \frac{|y^H(a_t \otimes (P_{\tilde{a}_r}^\perp a_r))|^2}{|a_t \otimes (P_{\tilde{a}_r}^\perp a_r)|^2}, \quad (28)$$

where $\hat{\sigma}^2 = 2|P_{H_1}^\perp y|^2/(MN-M-1)$ is an unbiased estimator of the noise power $\sigma^2$. (28) indicates to project interference signal $\tilde{a}'_t \otimes \tilde{a}_r$ to 0, i.e., $(\tilde{a}'_t \otimes \tilde{a}_r)^H(a_t \otimes (P_{\tilde{a}_r}^\perp a_r)) = ((\tilde{a}'_t)^H a_t) \otimes (\tilde{a}_r^H P_{\tilde{a}_r}^\perp)a_r = 0$, as the interference Rx steering vector is projected to its orthogonal subspace, i.e., $\tilde{a}_r^H P_{\tilde{a}_r}^\perp = 0$. However, such projection leads to a loss of object correlation gain, i.e., $(a_t \otimes a_r)^H(a_t \otimes (P_{\tilde{a}_r}^\perp a_r)) = MN(1-|g_r/N|^2) < MN$, where $g_r = \tilde{a}_r^H a_r$ and MN is an ideal object correlation gain of the clairvoyant detector.

Lemma 2—For (14), the probabilities of false alarm and detection for the GLRT solution in (28) can be computed as $$P_{FA} = Q_{F_{2,2(MN-1)}}(\gamma), P_D = Q_{F_{2,2(MN-1)}(\lambda)}(\gamma) \quad (29)$$

where $\gamma$ is the detection threshold, $F_{2,2(MN-1)}$ is the F-distribution with 2 and 2(MN−1)) degrees of freedom, $F_{2,2(MN-1)}(\lambda)$ is the noncentral F-distribution with 2 and 2 (MN−1)) degrees of freedom with noncentrality parameter $$\lambda = 2MN|b|^2(1-|g_r/N|^2)/\sigma^2 \quad (30)$$

It is evident from (29) that the GLRT detector is CFAR in the existence of the interference. With the two Lemmas, one can calculate performance loss from the clairvoyant detector of (28) to the GLRT detector of (15) $\lambda = \lambda^C(1-|g_r/N|^2)$ given by (18) and (30). Moreover, the performance loss stays the same when $\tilde{a}'_t$ changes and is reduced when N increases.

To evaluate the performance, $\tilde{a}'_t$ is set as $\tilde{a}'_t \sim \mathcal{CN}(0, \tilde{\sigma}^2 R)$, where $\tilde{\sigma}^2$ is interference power, and $R \triangleq [R_{i,j}]_0^{M-1}$ i a correlation matrix with correlation coefficient $\rho$ and $R_{i,j} = \rho^{|i-j|}$. Signal-to-noise ratio (SNR) is defined as $|b|^2/\sigma^2$ and interference-to-signal ratio (ISR) is defined as $\tilde{\sigma}^2/|b|^2$. Results of Theoretical performance is validated using receiver operating characteristics (ROC). The MIMO radar system 100 with M=4 Tx antennas, Tx and Rx antenna element spacing $d_t = 0.5\lambda$ and $d_r = Nd_t$; an object at 33° with SNR=−5 dB; an interferer with $\rho = 0.3$ and ISR=10 dB, are considered.

Figure 5A:
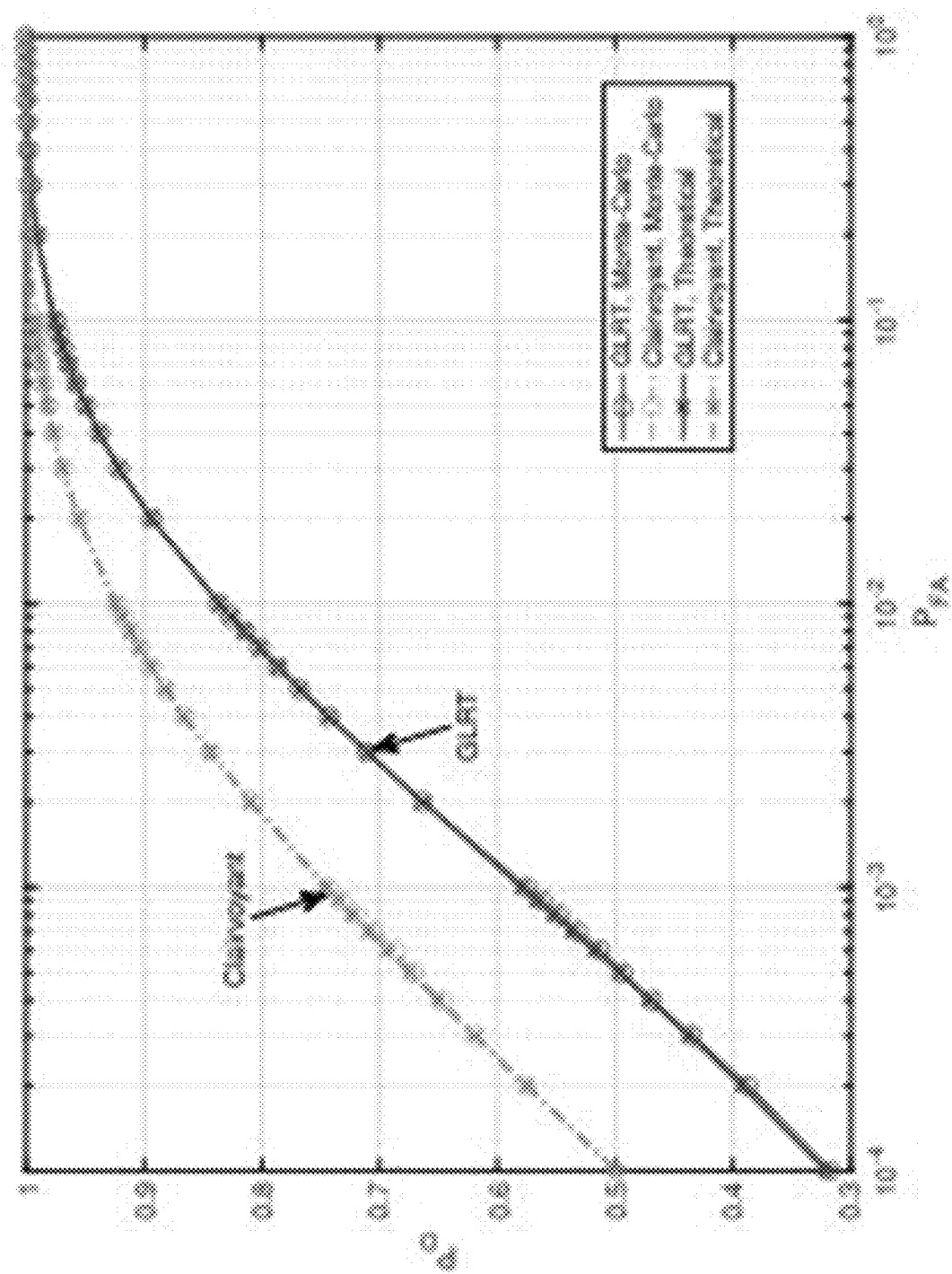
FIGS. 5A-5C illustrate performance evaluation of receiver operating characteristics (ROC) curves, according to an embodiment of the present disclosure.
Figure 5B:
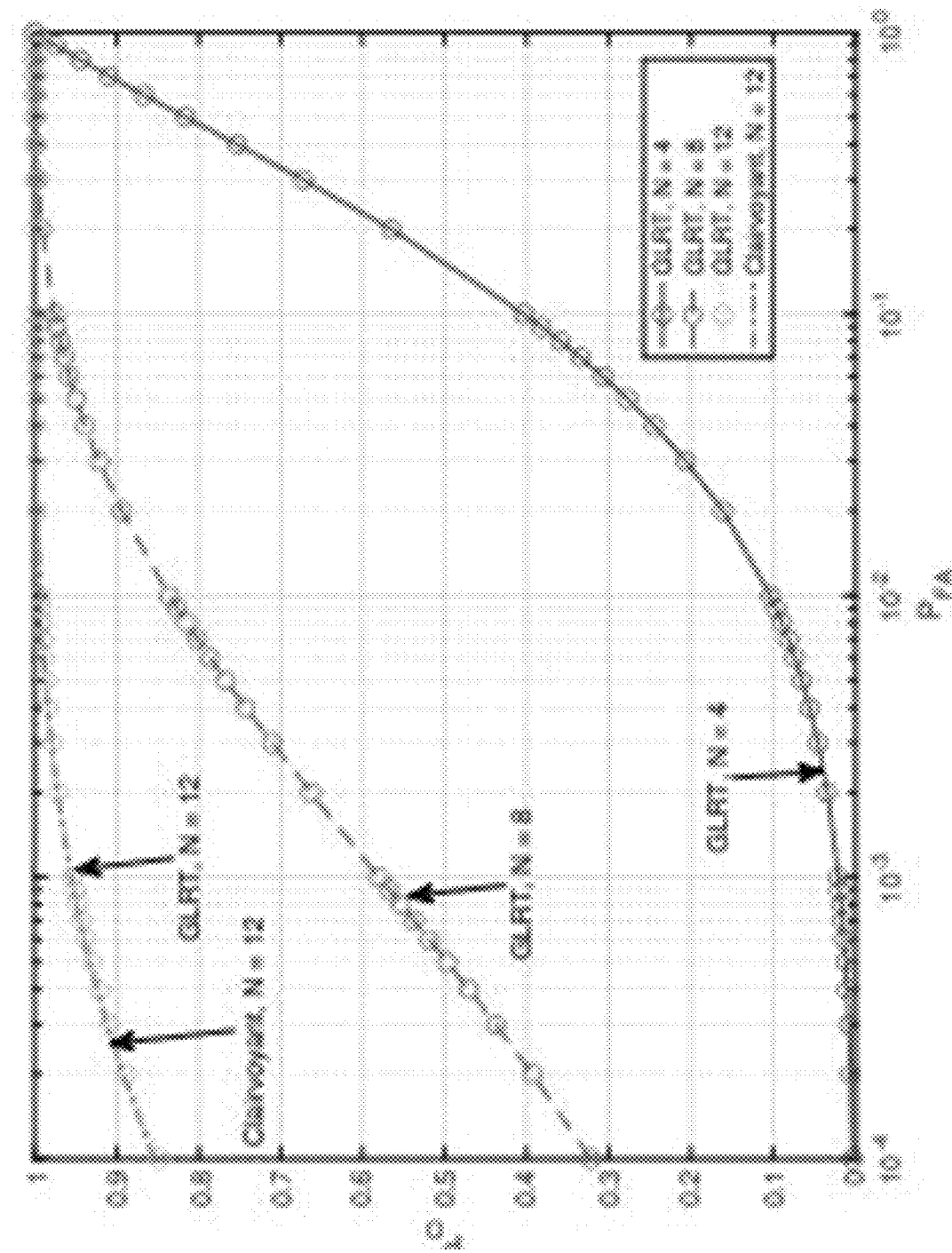
Figure 5C:
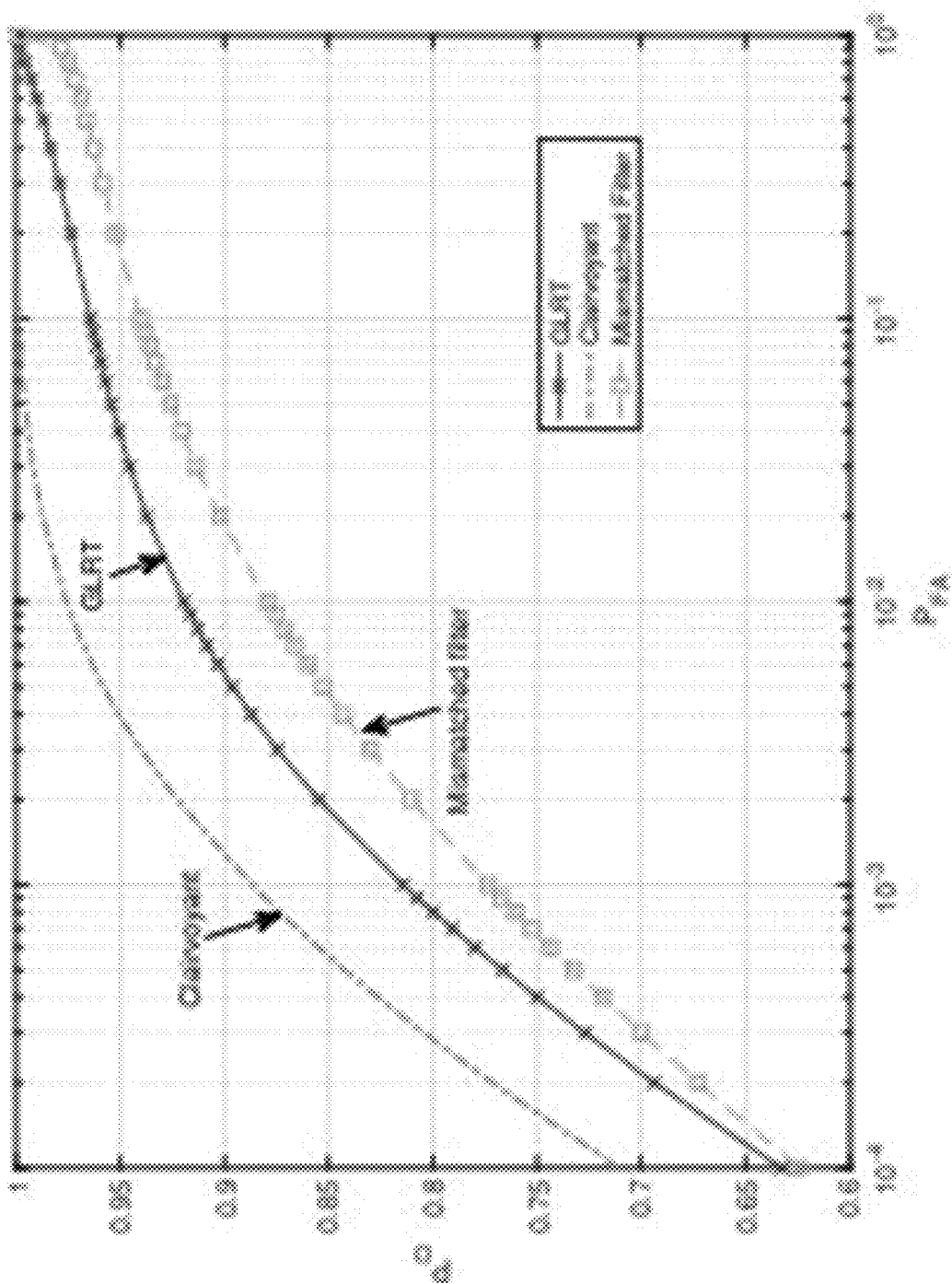

FIGS. 5A-5C illustrate performance evaluation of ROC curves, according to an embodiment of the present disclosure. FIG. 5A validates the theoretical ROC performance of the clairvoyant detector and the GLRT detector using Monte-Carlo simulation over $10^6$ runs. FIG. 5B shows that the ROC performance of the GLRT detector, in general, performs better with increase of Rx array size N, and is close to that of the performance of the clairvoyant detector when N is moderately large. FIG. 5C shows that an average performance of the GLRT detector performs in between the clairvoyant detector and a mismatched/regular filter.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

We claim:

1. A multiple-input multiple-output (MIMO) radar system for detecting an object in a scene, the MIMO radar system comprising:
    an ego-transmitter with a set of transmitters and an ego-receiver with a set of receivers with a known mutual arrangement to each other forming a virtual array of the MIMO radar system with pairwise combinations of different transmitters with different receivers configured to (1) transmit frequency modulated continuous wave (FMCW) in a radio frequency (RF) band over a sequence of pulse repetition intervals; and (2) collect radar measurements of the scene sampled in a time-frequency domain within an intermediate frequency (IF) bandwidth to which reflection of the transmitted FMCW is shifted by mixing with a copy of the FMCW;
    a memory configured to store a signal model with an internal classification that explains measurements corresponding to a segment of the scene defined by relative distance and relative velocity with respect to the ego-transmitter as a combination of an optional transmission of a hypothetical transmitter with a structure of the ego-transmitter and located within the segment of the scene to the ego-receiver and a mandatory transmission from an interfering transmitter with unknown structure and located within the segment of the scene to the ego-receiver; and a processor coupled with instructions that, when executed by the processor, cause the MIMO radar system to:

transform the radar measurements into range-doppler space to produce measurements of different segments of the scene for different range-doppler bins formed by intersections of different range bins with different Doppler bins;

classify a presence of the hypothetical transmitter at different segments of the scene according to the signal model with the internal classification explaining the measurements for different segments of the scene independently of each other;

combine the results of the classification to produce parameters of the object indicated by the results of classification of the presence or absence of the hypothetical transmitter in different segments of the scene; and output the parameters of the object.

2. The MIMO radar system of claim 1, wherein the signal model with the internal classification explains the measurements of the scene for different quantized angles at a range-doppler bin as a sum of a binary classified Kronecker product of an ego-transmitter steering vector and an ego-receiver steering vector modifying an unknown angle and a Kronecker product of an interfering-transmitter steering vector and the ego-receiver steering vector modifying the unknown angle.

3. The MIMO radar system of claim 1, wherein the signal model with the internal classification explains the measurements of the segment of the scene for different angles at a range-doppler bin as a sum of a binary classified Kronecker product of an ego-transmitter steering vector and an ego-receiver steering vector modifying a first unknown angle and a Kronecker product of an interfering-transmitter steering vector and the ego-receiver steering vector modifying a second unknown angle.

4. The MIMO radar system of claim 3, wherein the processor is further configured to evaluate measurements of different segments of the scene independently from each other, and wherein, for evaluating the measurements of the segment, the processor is further configured to test the presence of the hypothetical transmitter for each of different values of the first unknown angle to explain the measurements of the segment for different values of the second unknown angle.

5. The MIMO radar system of claim 3, wherein the processor is further configured to evaluate the measurements of the segment statistically over multiple pulse repetition intervals using a generalized likelihood ratio test (GLRT).

6. The MIMO radar system of claim 3, wherein the ego-transmitter steering vector is a function of a relative angle between each transmitter of the set of transmitters and the object, a wavelength of transmitted signal, and a relative distance between two consecutive transmitter elements of the set of transmitters.

7. The MIMO radar system of claim 3, wherein the ego-receiver steering vector is a function of a relative angle between each receiver of the set of receivers and the object, wavelength of received signal, and a relative distance between the two consecutive receiver elements of the set of receivers.

8. The MIMO radar system of claim 1, wherein the parameters of the object comprise at least one of radial velocity, a spatial angle, and a distance to the object.

9. The MIMO radar system of claim 1, wherein to produce the parameters of the object, the processor is further configured to execute a generalized likelihood ratio test (GLRT) algorithm.

10. The MIMO radar system of claim 1, wherein the signal model with the internal classification is formulated as either a first hypothesis or a second hypothesis, wherein the first hypothesis defines that the radar measurements include residual due to the interference, and noise, and wherein the second hypothesis defines that the radar measurements include reflected signals from the object, the residual due to the interference, and the noise.

11. The MIMO radar system of claim 9, wherein the processor is further configured to compare a GLRT statistic with a predetermined threshold, wherein the GLRT statistic is determined by the GLRT algorithm, and wherein the predetermined threshold is based on a number of transmitters and receivers.

12. The MIMO radar system of claim 11, wherein the first hypothesis is true if the GLRT statistic is less than the predetermined threshold.

13. The MIMO radar system of claim 11, wherein the second hypothesis is true if GLRT statistic is greater than the predetermined threshold.

14. A method for detecting an object in a scene, wherein the method uses a processor coupled to a memory storing a signal model with an internal classification that explains measurements corresponding to a segment of the scene defined by relative distance and relative velocity with respect to the ego-s transmitter as a combination of an optional transmission of a hypothetical transmitter with a structure of the ego-transmitter and located within the segment of the scene to the ego-receiver and a mandatory transmission from an interfering transmitter with unknown structure and located within the segment of the scene to the ego-receiver, wherein the processor is coupled with stored instructions implementing the method, wherein the instructions, when executed by the processor carry out steps of the method, comprising:

transmitting frequency modulated continuous wave (FMCW) in a radio frequency (RF) band over a sequence of pulse repetition intervals (PRI);

collecting radar measurements of the scene sampled in a time-frequency domain within an intermediate frequency (IF) bandwidth to which reflection of the transmitted FMCW is shifted by mixing with a copy of the FMCW;

transforming the radar measurements into range-doppler space to produce measurements of different segments of the scene for different range-doppler bins formed by intersections of different range bins with different Doppler bins;

classifying a presence of the hypothetical transmitter at different segments of the scene according to the signal model with the internal classification explaining the measurements for different segments of the scene independently of each other;

combining the results of the classification to produce parameters of the object indicated by the results of classification of the presence or absence of the hypothetical transmitter in different segments of the scene; and outputting the parameters of the object.

15. The method of claim 14, wherein the signal model with the internal classification explains the measurements of the scene for different quantized angles at a range-doppler bin as a sum of a binary classified Kronecker product of an ego-transmitter steering vector and an ego-receiver steering vector modifying an unknown angle and a Kronecker product of an interfering-transmitter steering vector and the ego-receiver steering vector modifying the unknown angle.

16. The method of claim 15, wherein the ego-transmitter steering vector is a function of a relative angle between each transmitter of the set of transmitters and the object, a wavelength of transmitted signal, and a relative distance between two consecutive transmitter elements of the set of transmitters.

17. The method of claim 15, wherein the ego-receiver steering vector is a function of a relative angle between each receiver of the set of receivers and the object, wavelength of received signal, and a relative distance between the two consecutive receiver elements of the set of receivers.

18. The method of claim 14, wherein the parameters of the object comprise at least one of radial velocity, a spatial angle, and a distance to the object.

19. The method of claim 14, wherein the signal model with the internal classification is formulated as either a first hypothesis or a second hypothesis, wherein the first hypothesis defines that the radar measurements include residual due to the interference, and noise, and wherein the second hypothesis defines that the radar measurements include reflected signals from the object, the residual due to the interference, and the noise.

20. A non-transitory computer-readable storage medium embodied thereon a program executable by a processor for performing a method for detecting an object in a scene, the method comprising:

transmitting frequency modulated continuous wave (FMCW) in a radio frequency (RF) band over a sequence of pulse repetition intervals (PRI);

collecting radar measurements of the scene sampled in a time-frequency domain within an intermediate frequency (IF) bandwidth to which reflection of the transmitted FMCW is shifted by mixing with a copy of the FMCW;

transforming the radar measurements into range-doppler space to produce measurements of different segments of the scene for different range-doppler bins formed by intersections of different range bins with different Doppler bins;

classifying a presence of the hypothetical transmitter at different segments of the scene according to a signal model, wherein the signal model with an internal classification that explains measurements corresponding to a segment of the scene defined by relative distance and relative velocity with respect to an ego-transmitter as a combination of an optional transmission of a hypothetical transmitter with a structure of the ego-transmitter and located within the segment of the scene to the ego-receiver and a mandatory transmission from an interfering transmitter with unknown structure and located within the segment of the scene to an ego-receiver;

combining the results of the classification to produce parameters of the object indicated by the results of classification of the presence or absence of the hypothetical transmitter in different segments of the scene; and outputting the parameters of the object.

* * * * *